United States Patent
Cha et al.

(10) Patent No.: US 9,807,608 B2
(45) Date of Patent: Oct. 31, 2017

(54) SYSTEM OF MULTIPLE DOMAINS AND DOMAIN OWNERSHIP

(75) Inventors: Inhyok Cha, Yardley, PA (US); Louis J. Guccione, East Chester, NY (US); Yogendra C. Shah, Exton, PA (US); Andreas U. Schmidt, Frankfurt (DE); Sudhir B. Pattar, Mount Laurel, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 738 days.

(21) Appl. No.: 12/763,827

(22) Filed: Apr. 20, 2010

(65) Prior Publication Data

US 2011/0099605 A1 Apr. 28, 2011

Related U.S. Application Data

(60) Provisional application No. 61/171,013, filed on Apr. 20, 2009, provisional application No. 61/226,550, filed on Jul. 17, 2009.

(51) Int. Cl.
*H04W 12/06* (2009.01)
*H04W 12/04* (2009.01)
*H04L 29/06* (2006.01)

(52) U.S. Cl.
CPC .......... *H04W 12/06* (2013.01); *H04L 63/20* (2013.01); *H04W 12/04* (2013.01)

(58) Field of Classification Search
CPC ........ H04W 12/06; H04W 12/04; H04L 63/20
(Continued)

(56) References Cited

U.S. PATENT DOCUMENTS 6,330,670 B1 * 12/2001 England et al. .............. 713/2
6,463,534 B1 * 10/2002 Geiger et al. .............. 713/168
(Continued)

FOREIGN PATENT DOCUMENTS

EP 1431862 6/2010
JP 2008-102925 A 5/2008
(Continued)

OTHER PUBLICATIONS

Security Aspects of Smart Cards vs. Embedded Security in Machine-to-Machine (M2M) Advanced Mobile Network Applications Mike Meyerstein, Inhyok Cha, and Yogendra ShahMobiSec 2009, LNICST 17, pp. 214-225, 2009. ICST Institute for Computer Sciences, Social-Informatics and Telecommunications Engineering 2009.*

(Continued)

*Primary Examiner* — Jeffrey D Popham
(74) *Attorney, Agent, or Firm* — Baker & Hostetler, LLP

(57) ABSTRACT

Methods and instrumentalities are disclosed that enable one or more domains on one or more devices to be owned or controlled by one or more different local or remote owners, while providing a level of system-wide management of those domains. Each domain may have a different owner, and each owner may specify policies for operation of its domain and for operation of its domain in relation to the platform on which the domain resides, and other domains. A system-wide domain manager may be resident on one of the domains. The system-wide domain manager may enforce the policies of the domain on which it is resident, and it may coordinate the enforcement of the other domains by their respective policies in relation to the domain in which the system-wide domain manager resides. Additionally, the system-wide domain manager may coordinate interaction (Continued)

among the other domains in accordance with their respective policies.

75 Claims, 10 Drawing Sheets

(58) Field of Classification Search
USPC .......................................................... 726/3
See application file for complete search history.

(56) References Cited

U.S. PATENT DOCUMENTS

| | | | |
|---|---|---|---|
| 7,140,039 B1* | 11/2006 | Yemeni et al. .................... 726/9 |
| 7,490,347 B1 | 2/2009 | Schneider et al. |
| 7,912,076 B2* | 3/2011 | Kim et al. ..................... 370/401 |
| 8,146,133 B2* | 3/2012 | Moon et al. ....................... 726/1 |
| 2003/0163733 A1* | 8/2003 | Barriga-Caceres et al. .. 713/201 |
| 2005/0120219 A1* | 6/2005 | Munetoh et al. ............. 713/176 |
| 2006/0015719 A1* | 1/2006 | Herbert ................. G06F 21/305 713/164 |
| 2006/0053276 A1* | 3/2006 | Lortz et al. ........................ 713/2 |
| 2007/0234432 A1 | 10/2007 | Korkishko et al. |
| 2008/0091604 A1 | 4/2008 | Wary |
| 2008/0133414 A1* | 6/2008 | Qin et al. ......................... 705/50 |
| 2008/0301770 A1* | 12/2008 | Kinder ................ H04L 63/0823 726/2 |
| 2009/0077643 A1 | 3/2009 | Schmidt et al. |
| 2009/0150969 A1* | 6/2009 | Davis et al. ....................... 726/1 |
| 2009/0228589 A1* | 9/2009 | Korupolu ............ H04L 67/1097 709/226 |
| 2010/0062808 A1 | 3/2010 | Cha et al. |
| 2010/0299652 A1* | 11/2010 | Lee et al. ...................... 717/120 |
| 2012/0144196 A1* | 6/2012 | Owen et al. .................. 713/168 |

FOREIGN PATENT DOCUMENTS

| | | |
|---|---|---|
| KR | 10-2007-0097736 | 10/2007 |
| KR | 10-2007-103205 | 10/2007 |
| KR | 10-2007-103205 | 12/2013 |
| WO | WO 2004-017592 | 2/2004 |
| WO | WO 2009/092115 | 7/2009 |
| WO | WO 2010/123890 | 10/2010 |

OTHER PUBLICATIONS

Smart OpenID presentation, by Interdigital and Novalyst IT Sep. 21, 2010; year 2010.*
ETSI SCP (Smart Card Platform) group document SCPt080131: an analysis of the requirements of the 102.412 V8.2.0 versus the GlobalPlatform Card Spec V2.2., Mar. 11, 2008, 3 pages.
ETSI SCP 102.412, V8.2.0, "Requirements for Confidential Applications",Jun. 2009, 69 pages.
GlobalPlatform, "Card Specification", www.globalplatform.org, Mar. 2006, V2.2, 1-355.
Matushima et al., "Multiple Personal Security Domains", ACM, IWCMC '06: Proceedings of the 2006 International Conference on Wireless Communications and Mobile Computing, Jul. 6, 2006, 361-366.
Trusted Computing Group, "TCG Mobile Reference Architecture", www.trustedcomputinggroup.org, Jun. 12, 2007, V1.0, 1-87.
Trusted Computing Group, "TCG Mobile Trusted Module Specification", www.trustedcomputinggroup.org, Jun. 26, 2008, V1.0, Revision 6, 1-105.
ETSI TS 102 412 V9.1.0 (Jun. 2009), titled Smart Cards; Smart Card Platform Requirements Stage 1 (Release 9), Published Jun. 2009, 69 pages.
ETSI 102.412, V8.2.0., Smart Cards; Smart Card Platform Requirements Stage 1 (Release 8), Oct. 2008.
European Patent Application No. 15 15 1652: European Search Report dated Jun. 19, 2015, 5 pages.
Japanese Patent Application No. 2016-155777: Notice of Allowance dated Sep. 5, 2017, 6 pages.

* cited by examiner

SYSTEM OF MULTIPLE DOMAINS AND DOMAIN OWNERSHIP

CROSS-REFERENCE TO RELATED APPLICATIONS

This application is based on, and claims priority to, U.S. Provisional Patent Application No. 61/171,013, filed on Apr. 20, 2009, and U.S. Provisional Patent Application No. 61/226,550, filed on Jul. 17, 2009, the disclosures of which are hereby incorporated herein by reference in their entireties.

BACKGROUND

There are many situations today in which a computing device, which may or may not communicate with other devices or entities, is used in a manner in which the device, or some portion or computing environment within the device, is "owned" by an individual, an organization or some other entity. By "owned," we mean that the device, or some portion or computing environment within it, may have been authenticated with the entity and the entity may thereafter have taken some form of control over the device or some portion of it. One example of such a situation is in the wireless mobile communications industry, where a user of a wireless device, such as a mobile telephone, may subscribe to the services of a particular mobile communication network operator.

In the mobile communications industry today, wireless devices with which a user may subscribe to the services of a particular network operator typically include a Subscriber Identity Module (SIM) or Universal Integrated Circuit Card (UICC). The SIM/UICC provides a wireless device with a secure execution and storage environment from which to execute authentication algorithms and store credentials that enable the device to authenticate the device user's subscription with the network operator toward the network operator and allow the network operator to have some form of control, i.e., ownership, over the device. Unfortunately, this SIM/UICC mechanism typically is limited to use with a single network operator.

Thus, a problem in many computing contexts today, like the situation described above with mobile communications devices, is that the computing devices often are limited to being "owned" in the entirety of the device by a single entity. And in many cases, that ownership must be established at the time of purchase of a device by a user, preventing business models in which it may be desirable to establish ownership at a later time. Furthermore, these limitations prevent use of the devices in situations in which it may be desirable for multiple ownership of a number of mutually isolated portions of the device to exist, or for ownership to be transitioned to other entities from time to time. For example, in the case of a wireless mobile communication device, such as a mobile telephone, users are typically required to subscribe to the services of a particular mobile network operator at the time of purchase, and such devices are often prevented from being used in applications where the mobile network operator may only be known some time after the purchase of the wireless device. Also, it is typically not possible for such devices to provide access to multiple operator networks at one time. Updating or changing mobile network and service subscriptions can be difficult, and doing so over-the-air is usually not possible.

Also, particularly in the context of wireless mobile communications devices, although the SIM/UICC mechanism is generally considered to be highly secure, the security is not linked strongly to security properties of the whole device on which it resides. This limits the application of scaling security concepts for advanced services and applications such as mobile financial transactions. In particular, these shortcomings are relevant for autonomous devices, such as, machine-to-machine (M2M) communication devices.

Accordingly, a more dynamic and secure solution is desirable.

SUMMARY

To overcome at least some of the shortcomings of present systems described above, methods and instrumentalities are disclosed that enable one or more separate domains on one or more devices to be owned or controlled by one or more different local or remote owners, while at the same time providing a level of system-wide management of those domains. An exemplary system embodying these methods and instrumentalities may comprise one or more devices, each of which may comprise one or more domains supported by at least one platform. Each platform may provide low-level computing, storage, or communication resources for the domains. A platform may consist of some hardware, an operating system, some low-level firmware or software (such as boot codes, BIOS, APIs, drivers, middleware, or virtualization software) and some high-level firmware or software (such as application software) and respective configuration data for such resources. Each domain may comprise a configuration of computing, storage, or communication resources executing on the at least one platform and each domain may be configured to perform functions for an owner of the domain that may be located locally or remotely from the domain. Each domain may have a different owner, and each owner may specify policies for operation its domain as well as for operation of its domain in relation to the platform on which the domain resides and other domains.

A system-wide domain manager may be resident on one of the domains. The system-wide domain manager may enforce the policies of the domain on which it is resident, and it may coordinate how other domains may enforce their respective policies in relation to the domain in which the system-wide domain manager resides. Additionally, the system-wide domain manager may coordinate interaction among the other domains in accordance with their respective policies. The domain in which the system-wide domain manager resides may be owned by the owner of the device that houses the domain. Alternatively, such a domain may be owned by an owner who may not own the device that houses the domain.

Other features of the system, methods and instrumentalities described herein are provided in the following detailed description and accompanying drawings.

DETAILED DESCRIPTION OF ILLUSTRATIVE EMBODIMENTS

Figure 1:
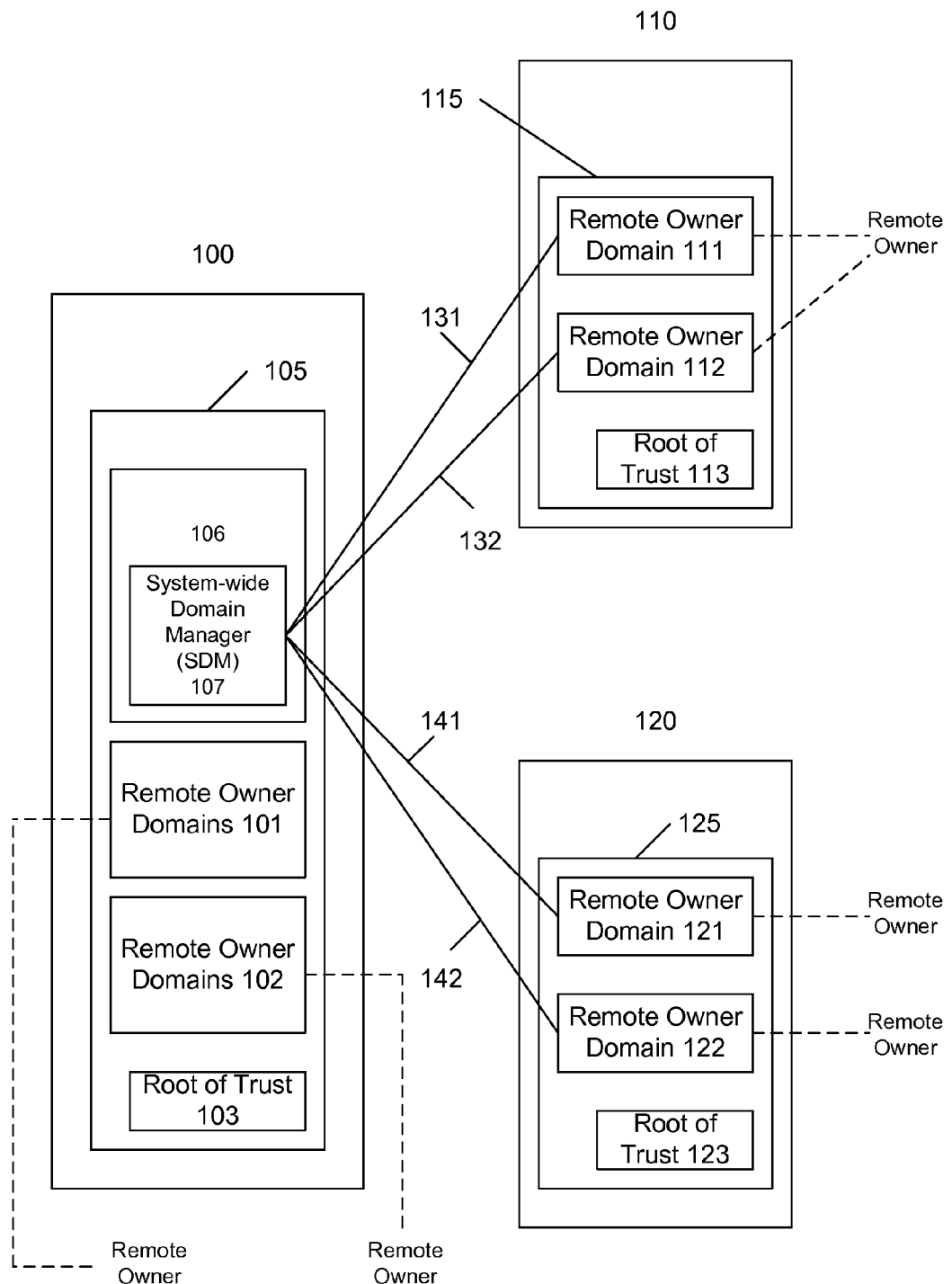
FIG. 1 illustrates an exemplary system in which the methods and instrumentalities described herein may be employed.

To overcome at least some of the shortcomings of present systems described above, methods and instrumentalities are disclosed that enable one or more separate domains on one or more devices to be owned or controlled by one or more different local or remote owners, while at the same time providing a level of system-wide management of those domains. An exemplary system embodying these methods and instrumentalities may comprise one or more devices, each of which may comprise one or more domains supported by at least one platform. Each platform may provide low-level computing, storage, or communication resources for the domains. A platform may consist of some hardware, an operating system, and other low-level firmware or software (such as boot codes, BIOS, and drivers) and respective configuration data for such resources. Each domain may comprise a configuration of computing, storage, or communication resources executing on the at least one platform and each domain may be configured to perform functions for an owner of the domain that may be located locally or remotely from the domain. Each domain may have a different owner, and each owner may specify policies for operation its domain as well as for operation of its domain in relation to the platform on which the domain resides and other domains.

Each domain may be isolated from other domains, with respect to computing, storage, or communication resources (from the input point of view) or functionalities that the domain provide by using such computing, storage, or communication resources (from the output point of view). Each domain may draw on computing, storage, or communication resources or functionalities of a common underlying platform. Some domains may share some of such functionalities provided by the common platform. Such sharing of platform resources functionalities may be done in a way that each domain's use of the common resources or functionalities may be isolated from another domain's such use. For example, such isolation may be achieved by the platform of the device enforcing a strict access control to the resources it provides to each of the domains so that any access to the resources of a domain may be allowed only to the user(s), owner(s), or other entities or processes external to the domain that are authorized by the platform and/or the domain's owner. A platform may also simply consist of the part of the device that is not part of any of the isolated domains on the device, in so far as any of the domain's functionality depends on the resources of the device that is outside of any of the domains on the device.

Communication between any two domains on the same or different platforms, or on same or different devices, may be made secure, meaning that the domains may be able to authenticate each other in a secure way (e.g. by using cryptographic means), and also to protect the messages exchanged between them for such security aspects as confidentiality, integrity, and freshness. Cryptographic means provided by the platform(s) on which the domains reside may be used to provide such secure communication between any such two domains.

A system-wide domain manager may be resident on one of the domains. The system-wide domain manager may enforce the policies of the domain on which it is resident, and it may coordinate the enforcement of the other domains by their respective policies in relation to the domain in which the system-wide domain manager resides. Additionally, the system-wide domain manager may coordinate interaction among the other domains in accordance with their respective policies. The domain in which the system-wide domain manager resides may be owned by the owner of the device that houses the domain. Alternatively, such a domain may be owned by an owner who may not own the device that houses the domain.

FIG. 1 illustrates one embodiment of such a system. As shown, the system may comprise one or more devices 100, 110 and 120. Each device may comprise one or more domains supported by at least one platform. For example, device 100 may comprise a domain 106 and one or more other domains 101, 102. While three domains are illustrated for device 100, in other embodiments the number of domains may be more or less. Each of those domains 101, 102, 106 may comprise a configuration of computing, storage, or communication resources executing on at least one platform 105 of the device. Each domain may be configured to perform functions for an owner of the domain that may be located locally or remotely from the domain. For example, the domain 106 may be owned by the device owner (not shown), whereas the domains 101, 102 may be owned by one or more remote owners. Each domain may have a different owner, or more than one domain of the device may be owned by the same owner. Each owner may specify policies for operation its domain as well as for operation of its domain in relation to the platform on which the domain operates, the device in which the domain resides, and other domains within the same or different device.

As mentioned, the system may also include other devices on which other domains reside. For example, device 110 may include domains 111 and 112, each of which may be owned by the same remote owner. Of course, each of the domains 111 and 112 could instead each be owned by a different owner. Each of the domains 111, 112 may comprise a configuration of computing, storage, or communication resources executing on a platform 115 of the device 110. Similarly, device 120 may include domains 111 and 112. As shown in this example, each of those domains may be owned by a different owner. Alternatively, those domains could be owned by the same owner. Again, each of the domains 121, 122 may comprise a configuration of computing, storage or communication resources executing on a platform 125 of the device 120.

A system-wide domain manager (SDM) 107 may be resident on one of the domains. In this example, the SDM 107 resides on domain 106 of device 100. In one embodiment, the domain on which the SDM resides (e.g., domain 106) is owned by the owner of the device 100. The SDM 107 communicates with the remote domains 101 on device 100 via communication mechanisms provided in the device 100. Additionally, the SDM 107 communicates with the domains on other devices via respective communication channels 131, 132, 141, 142 which may be wired or wireless channels. The communication channels 131, 132, 141, and 142 may be secure. The SDM 107 may enforce the policies of the domain 106 on which it is resident, and it may coordinate the enforcement of the other domains 101, 111, 112, 121, 122 by their respective policies in relation to the domain 106. Additionally, the SDM 107 may coordinate interaction among the other domains in accordance with their respective policies as well as the policy of the domain (which would be the policy of the owner of that particular domain) in which the SDM resides.

As an example, in one embodiment, a domain may be owned by a service provider. For example, domain 102 of the device 100 may be owned by a service provider, such as, by way of example only, a mobile network operator. That domain 102 may perform a subscriber identity module (SIM) function to authenticate the device 100 or, in some cases equivalently, the subscription of the owner or user of the device, toward the service provider in order to enable communications between the device 100 and the service provider.

In addition to the functions of the SDM described above, the SDM 107 may access information and provide a list of resources available for use by said one or more domains. The SDM 107 may also supervise the loading and maintenance of domains owned by remote owners. The SDM 107 may provide a user of the device 100 in which it resides with a list of domains that it is capable of loading and may request that the user choose which of the listed domains to load. The SDM may also evaluate whether there are sufficient computing resources on the platform or the device to load, and thus support the operation of, one or more domains.

As also mentioned above, the SDM 107 may take part in enforcing its own polic(ies), which may be referred to herein as a system-wide domain policy (SDP), as well as the polic(ies) of the other domains, i.e., domain-specific policies (DPs). The SDM 107 may consider policies of one or more existing domains when evaluating whether to load a new domain. For example, a policy of a given domain owned by a remote owner may specify that the given domain be rendered inactive when a certain type of other domain becomes active. In another example, a policy of a given domain owned by a remote owner may specify that the given domain be rendered inactive when another domain owned by a certain other remote owner becomes active. In yet another example, a policy of a given domain owned by a remote owner may specify that operation of the given domain be limited in some specific way(s) when a certain type of other domain becomes active. In a further example, a policy of a given domain owned by a remote owner may specify that operation of the given domain be limited in some specific way(s) when another domain owned by a certain other remote owner becomes active. The SDM 107 may be responsible for enforcement of all of these types of policies.

The SDM 107 may also establish or load domains for which remote owners may take ownership at a later time. For example, such a domain may be established in a state, referred to herein as a "pristine" state, in which it is not owned by any owner, and, the SDM 107 may manage the establishment of ownership of the domain by a remote owner.

To that end, the SDM 107 may transmit information to a remote owner that the remote owner may consider in determining whether to establish ownership of the domain. The information may include at least one of (i) information attesting to an integrity of the domain for which ownership is sought; and (ii) information attesting to an integrity of at least one other domain of the system. The information may also include (i) information attesting to an integrity of the platform using whose resources the domain for which the ownership is sought for operates; and (ii) information attesting to an integrity of the platform using whose resources at least one other domain of the system operates. In addition, the information may include information concerning a current environment of the device. Such information may include at least one of: (i) a value indicating a number of other domains in the system; (ii) information providing a summary nature of other domains in the system; and (iii) information specifying resources of the platform available for use by the domain for which ownership is attempting to be established. The degree to which information is provided to the remote owner about other domains of the system may be conditioned on the respective policies of those other domains with respect to confidentiality and/or isolation.

After a remote owner takes ownership of a domain, the remote owner may exercise a degree of control over the domain. For example, after a remote owner establishes ownership of a domain, the domain may receive from the remote owner at least one of cryptographic keys, configuration information, parameters and executable code to increase the functionality of the domain. In another example, after a remote owner establishes ownership of the domain, the domain may receive its domain-specific policy from the remote owner.

The system disclosed herein may also provide for isolation and security of one or more domains. For example, one or more of the domains may comprise a secure execution and storage environment that is isolated from other domains. To achieve such a secure environment, the platform of a device on which one or more domains is established, such as the platform 105 of device 100 in FIG. 1, may comprise a root of trust 103. The root of trust 103 may comprise an immutable and immovable set of hardware resources, the integrity of which is pre-established and can be relied upon by others, including a remote owner of a domain. An integrity of a domain, such as domain 101, may be established by a chain of trust anchored by the root of trust 103. For example, an integrity of the domain 101 may be established by comparing a measurement of at least one component of the domain 101, which measurement may be generated by the root of trust 103, to a reference integrity metric, which may be stored in the root of trust 103 and used by the root of trust to verify the integrity of the domain. Alternatively, the reference integrity metric may be stored by a remote owner, and the measurement may be transmitted to the remote owner for comparison with the reference integrity metric. The integrity of the domain may be verified if the measurement matches the reference integrity metric. In one example embodiment, the measurement may comprise a hash computed over the component, and the reference integrity metric may comprise a hash previously computed over the component and accompanied by a digital certificate that provides an indication of authenticity of the reference integrity metric. A reference integrity metric may be pre-provisioned into the device at the time of manufacture or at the time of the delivery of device to its owner. A reference integrity metric may also be delivered from a remote source over a communication channel (e.g. an over-the-air wireless communication channel) after the manufacturer/supply of the device to its owner and provisioned into the device after delivery. A reference integrity metric may be delivered to the device enclosed in a certificate. Such a certificate may be verified by a trusted third party for use after its delivery to the device.

The system disclosed herein, and its various methods and instrumentalities, may be embodied in a wide variety of computing and communications contexts. Accordingly, the devices of the system, such as the example devices 100, 110 and 120 of FIG. 1, may take a variety of forms. By way of example, and without any limitation, a device of the system may comprise a wireless transmit/receive unit (WTRU), a user equipment (UE), a mobile station, a fixed or mobile subscriber unit, a pager, a cellular telephone, a personal digital assistant (PDA), a computer, a machine-to-machine (M2M) device, a SIM card, a Universal Integrated Circuit Card (UICC), a smart card, a geo-tracking device, a sensor-network node, a metering device (such as a water, gas or electricity meter), or any other type of computing or communication device capable of operating in a wireless or wired environment. The following figures and description provide a number of additional example embodiments of the systems and methods of this disclosure in a wireless transmit/receive unit (WTRU). It is understood, however, that these embodiments are merely exemplary, and the systems and methods disclosed herein are by no means limited to those embodiments. Rather, as described above, the systems and method described herein may be employed in a wide variety of computing and communications environments.

Figure 2:
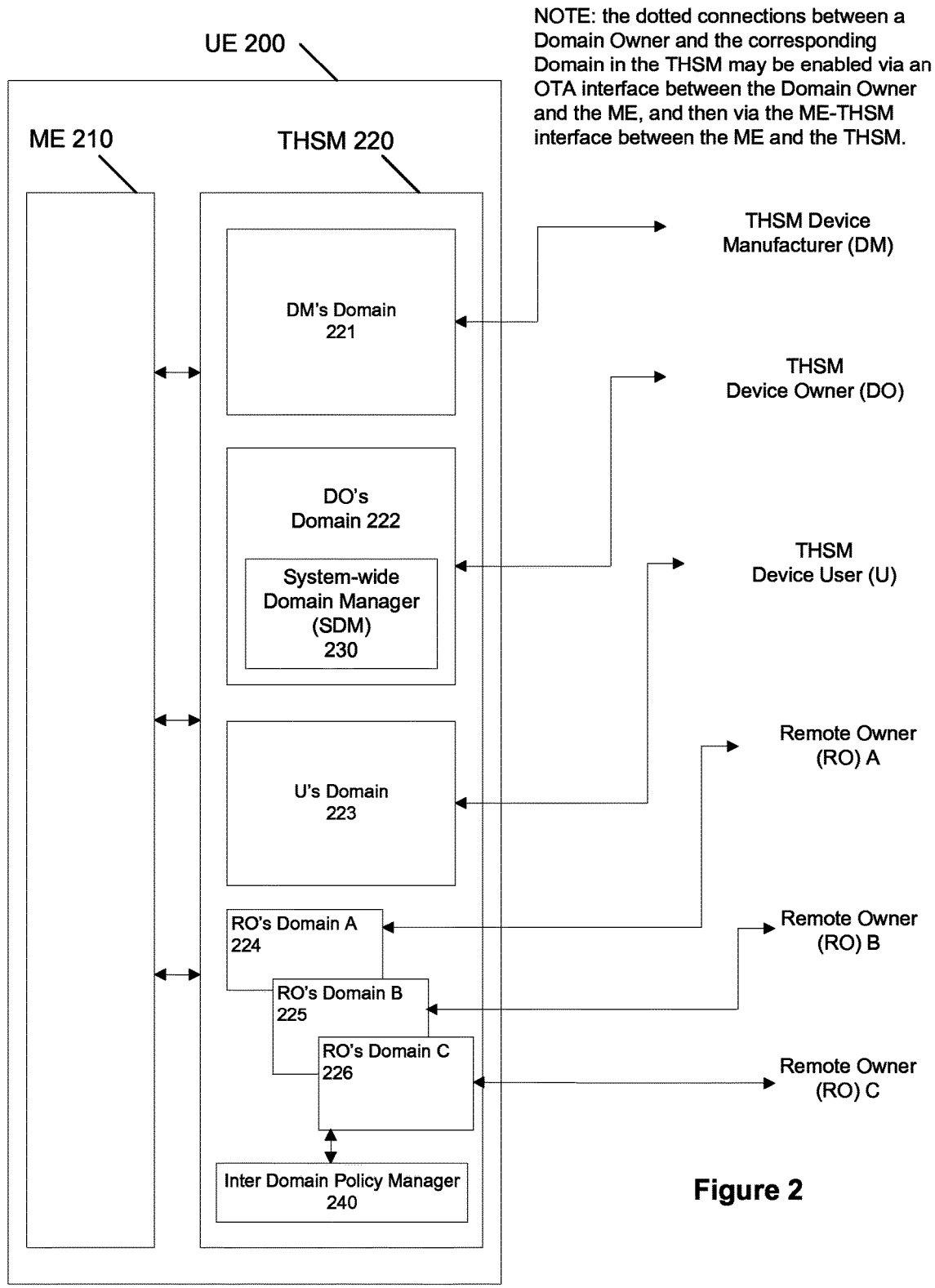
FIG. 2 illustrates one embodiment of a system in which the methods and instrumentalities described herein are embodied in a user equipment (UE).

FIG. 2 is a diagram illustrating one embodiment of a WTRU in which the systems and method described herein may be embodied. As shown, the WTRU may comprise a mobile device, such as UE 200. UE 200 may comprise Mobile Equipment (ME) 210 and a Trusted Hardware Subscription Module (THSM) 220. In addition, THSM 220 may further comprise a THSM Device Manufacturer (DM) Domain 221, a THSM Device Owner (DO) Domain 222, a THSM Device User (DU or U) Domain 223, a System-Wide Domain Manager (SDM) 230, an Inter Domain Policy Manager 240 and one or more Remote Owner (RO) Domains, such as RO's Domain A 224, RO's Domain B 225 and RO's Domain C 226. Further, UE 200 may comprise the following non-illustrated components: a processor, a receiver, a transmitter and an antenna. The exemplary implementations described herein may refer to components such as those described in relation to FIG. 2.

A THSM may be a hardware-based module that provides trusted subscription management functions, including those typically performed by SIM functions, USIM functions, ISIM functions, and access network subscriptions. The THSM may be a hardware-protected module. It may include hardware that is specifically designed with relevant security features. It may be capable of internally supporting multiple isolated domains. A domain may be claimed or owned by a distinctive owner called a Remote Owner (RO). A domain claimed by a RO may act as a proxy for the respective RO.

One or more of the domains may perform subscription management functions, such as Trusted Subscription Identity Management (TSIM). Since multiple domains with TSIM functionality may exist on a single THSM, a THSM may support subscription management for multiple ROs. Some aspects of the management of TSIM-capable domains may be performed by a single managing function called System-wide Domain Manager (SDM). Other aspects may be managed individually within and on an individual domain.

Although described in terms of a Universal Mobile Telecommunication System (UMTS) environment, one skilled in the art may recognize that the methods and apparatuses described herein are applicable to other environments without exceeding the scope of the application. TSIM may be a representative example of a "subscription application." For example, if implemented on a WTRU that operates in a 3G UMTS network, the TSIM may include, as part of its functionality, all of the subscription related functions, including the UMTS authentication and key agreement (AKA) functionality. The TSIM, may not be bound to a specific hardware, such as the UICC. This is in contrast with a USIM, which can only exist on a UICC. Instead, a TSIM may be implemented on a Trusted Hardware Subscription Module (THSM) as described herein. One skilled in the art would also recognize that the functionality of a THSM as described herein may be incorporated in a UICC or a similar smart card, such as a UICC that conforms to European Telecommunications Standards Institute (ETSI) UICC requirements or a smart card that conforms to the Global Platform specifications, without exceeding the scope of the application.

A WTRU may include a THSM and a mobile equipment (ME). The ME may include a modem, a radio, a power supply, and various other features typically found in a WTRU. The THSM may include a separate hardware-based module. The THSM may be embedded on the WTRU or it may be independent. The THSM may be logically separate from the ME even if it is embedded on the WTRU. A THSM may include one or more domains, each owned by a particular Owner of the domain and operated for the benefit of the owner to provide secure, trusted services and applications. Therefore, for example, a DM's Domain may be denoted as $TD_{DM}$, and the DO's domain as $TD_{DO}$. Domains in a THSM may perform security-sensitive functions and applications that may not be safe or convenient to perform in the ME.

Some domains may be owned and managed by one or more service providers. For example: mobile network operators (MNO)s; other communication network operators, such as, wireless local area network (WLAN) providers, or WiMax providers; application service providers, such as, service providers in mobile payment, mobile ticketing, digital rights management (DRM), mobile TV, or location-based services; or IP Multimedia Core Network Subsystem (IMS) service providers. Subscription management may be supported by domains that are owned by service providers. For simplicity, subscription management functions implemented on a THSM domain may be denoted TSIM functions hereinafter. Support for TSIM functions may vary by domain. For example, supported TSIM functionality may include functions that are similar to those provided by the USIM and ISIM applications on the UICC on a mobile terminal. A THSM may, like a UICC, include functionality, applications, and data in addition to what is provided by the TSIM.

A TSIM may be a software unit or virtual application. A TSIM may initially have no credentials associated with a particular network operator or Public Land Mobile Network (PLMN). A TSIM may refer to management of subscription credentials/applications for a UMTS cellular access network. For example, the TSIM may include management of a strong secret (Ki), such as a UMTS authentication key. In the M2M context, a TSIM may also include a M2M Connectivity Identity Management (MCIM).

The THSM may include a Core Root of Trust (RoT) of Measurement (CRTM) unit similar to a root of trust of measurement (RTM) that can be found in a computing device that has a trusted platform module (TPM) or a mobile trusted module (MTM). The THSM's CRTM may measure the integrity of the THSM boot code at, for example, the THSM's boot time. The integrity metric may be computed through Extend operation, for example, by applying a cryptographic digest value operation on the THSM's boot code, BIOS, and, optionally, a manufacturer's characteristics of the THSM, such as a Version number, Software configuration, or release number. For example, the integrity metric may be computed using a version of a Secure Hash Algorithm (SHA) hashing algorithm, such as SHA-X.

The THSM may include a core RoT of Storage (CRTS) unit, similar to a root of trust for storage (RTS) found in a TPM or a MTM, configured to store integrity metrics in protected storage. The THSM may also include a Core RoT of Reporting (CRTR) unit, similar to a root of trust for reporting (RTR) found in a TPM or a MTM, configured to report the THSM's integrity measurement to external challengers.

Thus, the THSM may effectively provide capability similar to that of a TPM or a MTM in terms of trust measurement, storage, and reporting. A THSM may also include the capability to realize the multiple trusted stakeholder engines. Further, the THSM may be configured to realize respective multiple-stakeholder trusted subsystems. Therefore, the THSM may be similar to a trusted mobile phone as defined by the TCG Mobile Phone Working Group (MPWG) specifications.

The THSM may be configured to build multiple internal "stake-holder domains" using, for example, the Core RoT capabilities described herein. A stakeholder may be the THSM Device Manufacturer (DM), the THSM Device Owner (DO), or the THSM Device User (DU). The DU may be the same as the DO or may be distinct from the DO. There may be more than one DU per THSM. A stakeholder may also be a different remote owner (RO) of domains that are specifically leased or owned by the DO. For example, a third generation partnership project (3GPP) PLMN operator, such as a MNO, an IMS service provider, a non-3GPP access network operator, or a value-added application service provider, may be a stakeholder.

Some domains may be mandatory, in which case they may be pre-configured at manufacture time of the THSM. For example, the DM's domain may be mandatory and it may be built or loaded at boot time according to a pre-configured file. The DO's domain may also be mandatory and it may be built to a pre-provisioned configuration. Alternatively, the domain may be built according to a configuration file that is downloaded.

Domains other than the DM's domain may be subject to a Remote Take-Ownership (RTO) process before they can be "claimed" and "owned" by the domain's owner. Before a specific domain has gone through a RTO process, a "pristine" domain for a non-specified owner may exist. In this case, there is no specific ownership claimed for the domain.

A domain on the THSM may communicate and exchange information with the ME via a THSM-ME interface. For example, a domain may communicate with the ME during a boot-up or RTO process. Protection of data exchanged over the THSM-ME interface may be required.

Integrity protection of all communications across the THSM-ME interface may be required. For example, integrity protection may use cryptographic keys, such as, pre-provisioned temporary keys or keys that are exchanged by using authenticated key exchange mechanisms. The cryptographic keys may be symmetric, such as Ktemp_I, or asymmetric, such as Kpub/priv_THSM_temp_I for public or private keys used by the THSM for integrity and Kpub/priv_ME_temp_I for public or private keys used by the ME for integrity. Temporary keys may be used for the protection of the interfaces. For example, a temporary key may be associated with a validity period, or may be used one time, or a predetermined number of times.

The confidentiality of communications across the THSM-ME interface may also be provided using cryptographic means. Pre-provisioned temporary keys or keys that are exchanged by using authenticated key exchange mechanisms may be used. Cryptographic keys may be symmetric, such as, Ktemp_C for ciphering, or asymmetric, such as, Kpub/priv_THSM_temp_C for public or private keys used by the THSM for ciphering, and Kpub/priv_ME_temp_C for public or private keys used by the ME for ciphering. The RTO methods and apparatuses described herein refer to the use of pre-provisioned symmetric temporary keys for simplicity. However, one skilled in the art would recognize that other key implementations may be used without exceeding the scope of the application.

Prevention against replay attacks with respect to messages passed in the clear between the THSM-ME with RO's may be provided. Each message sent over the THSM-ME interface may possess a freshness quality with the use of a nonce. For simplicity, the RTO protocols described herein may include anti-replay protection of all messages being exchanged across the ME-THSM interfaces; however, one skilled in the art would recognize that other interface protection configurations may be used without exceeding the scope of the application.

Signatures may be applied to hashes. For example, hashes may be produced by the SHA-X algorithm. A trusted third party may certify, using a certificate ($Cert_{TSIM}$), a private-public key pair, such as $K_{TSIM-Priv}$ and $K_{TSIM-Pub}$, associated with the THSM. The trusted third party may also certify, using a certificate ($Cert_{RO}$), another set of keys, such as $K_{RO-Priv}$ and $K_{RO-Pub}$, associated with the network. These certificates may be stored in the protected storage allotted to the domain in question.

A public key, $K_{RO-Pub}$, may be used by the THSM platform, specifically the TSIM, to verify signatures from the RO or to encrypt messages sent to the RO. The private key, $K_{RO-Priv}$, may be used by the network for signing purposes and to decrypt messages encrypted by the TSIM using the corresponding public key. The public-private key pair, $K_{TSIM-Pub}$ and $K_{TSIM-Priv}$, may include similar functions, except that the roles of the TSIM and the RO are switched. Alternatively, there may be separate key pairs for encryption and signing, at both the RO and the TSIM.

The key pairs $K_{RO-Priv}$ and $K_{RO-Pub}$, and $K_{TSIM-Priv}$ and $K_{TSIM-Pub}$, may depend on particular network service selected by the owner, the user, or both. Each service provider, such as an RO, may have its own certified public-private key pair for each domain on the THSM associated with that provider. The selected service may determine which set of key pairs is used. For example, the set of public private key pairs may be determined by the selected service provider and the associated domain on the THSM. There may be no negotiation of the key pair used. The public or private key pair may be determined by the service provider and may be tightly associated with the THSM subsystem or domain.

The THSM $TD_{DO}$ may configure a "System-wide Domain Manager" (SDM). The SDM may protectively store a pre-configured file including a "System-wide Domain Policy" (SDP). The SDM may build or load the RO's domains for the THSM according to the SDP. The SDM may be included in a pristine configuration of the DO's domain. The SDM may use a pre-configured SDP to determine which other domains should be built, and in what order.

The SDM, on behalf of and when requested by a RO domain, may prepare and furnish a THSM Platform Environment Summary (TPES) and a THSM Platform Integrity Attestation (TPIA). A TPES may describe summary information about the most current "environment" of the THSM. Such information may include the number and summary nature of the domains, as conditioned or allowed by the respective domain policies with regard to confidentiality and isolation, on the THSM and any remaining resources on the THSM that may be available for communication and sharing of functions or resources with the requesting domain. A TPIA may include a collection of Integrity Attestations on one or more of the domains of the THSM. A TPIA may also include Integrity Attestations for the platform that supports the said domains. A TPIA may be used to attest to the trust state of the domains of interest and the platform which supports those domains to an external verifier, such as an RO that is interested in performing an RTO process for a pristine domain on the THSM. An RO, or the RO's domain ($TD_{RO}$), may request the SDM for the TPIA. The SDM may oblige or reject the request according to the SDP.

The SDM may also interact with a Physically Present Device Owner, such as service personnel, of the THSM to interactively identify other domains that should be built and in what order. Moreover, the SDM may also request the User's domain to interact with a physically present user of the THSM to provide input for the domains to be built and the build order. This information may be used as input in the domain build process.

The THSM, when it performs RTO processes for an RO's domain, may be configured to achieve four distinct system states before the completion of the remote take-ownership protocol. The THSM Pre_Boot system state may indicate that that the THSM has not been "powered-on." The THSM_$TD_{DM}$_LOAD_COMPLETE system state may indicate that the DM's domain on the THSM has been built or loaded as the first step after power-on of the THSM. The THSM_$TD_{DO}$_LOAD_COMPLETE system state may indicate that the DO's domain ($TD_{DO}$) was built or loaded to a last-configuration-available. This "last configuration available" may be a "pristine" configuration, if the DO's domain has never gone through an RTO process for itself, or, a "post-RTO" configuration. The DM's domain may build or load the DO's domain. Before the DO's domain goes through at least one RTO process, the DO's domain may be in a "pristine" state, and may not be claimed or owned by any specific DO. The "pristine" domain may include a "shell." The first time that the DO's domain is built or loaded, the "last configuration available" (referred to here and after as Last-Configuration) comes from Pre-Configured Files.

Alternatively, if the "Last Configuration" is due to an RTO process for the RO's domain, the particular domain on the THSM may have gone through a remote take-ownership protocol at least once and the remote owner may have taken ownership of the $TSS_{RO}$. This may indicate the trusted subsystem that has been configured on the platform upon remote take ownership completion. When or before this state is reached, the particular RO may begin performing other tasks.

The THSM_$TD_{RO}$_LOAD_COMPLETE system state may indicate that the RO's domain ($TD_{RO}$) was built or loaded to the last configuration available. This "last configuration available" may be a "pristine" configuration if the RO's domain has never gone through an RTO process for itself, or, may be a "post-RTO" configuration. The DM's domain may build or load the RO's domain. Before the DO's domain goes through at least one RTO process, the DO's domain may be in a "pristine" state, and may not be claimed or owned by any specific DO. The "pristine" domain may include a "shell." The first time that the RO's TD is built or loaded, the Last-Configuration may come from Pre-Configured Files.

Alternatively, if the Last Configuration is due to an RTO process for the RO's TD, the particular TD on the THSM may have gone through a RTO protocol at least once and the RO has taken ownership of the $TD_{RO}$. This indicates the trusted subsystem that has been configured on the platform upon RTO completion. By the time this state is reached, the particular RO may begin performing other tasks. If the RO's TD ($TD_{RO}$) is a MNO's TD, then, by this stage, the MNO's TD may provide the eventual Trusted Subscription Identity Management (TSIM) functionality realized on that $TD_{RO}$.

Alternatively, the System-wide Domain Manager (SDM) may be implemented in the DM's TD, rather than the DO's TD. The DO, after providing proper authorization data to the DM's TD, may use the SDM provided by the DM's TD to perform the task of creating, loading, and otherwise managing the various remote-owner TDs on the THSM. The details of the THSM system boot sequence and the RTO process sequence of this case may differ from those described herein, but are within the scope of the application. The boot-up and RTO processes for this case, as well as a description of how the DO or the DO's TD may use the SDM provided by the DM's TD, for example, what kind of authorization data may be provided (and how it may be provided) may be similar to those described herein. For example, a THSM embodied as a smart card may include a Card Manager, with functions supporting the Card Manager functionality specified by such standards as Global Platform, which is responsible for managing Security Domains on the card, on behalf of the Card Issuer. The Card Issuer may be similar to a DM, and the Card Manager may include some of the functionality of the SDM. Therefore, the Card Manager may be similar to the SDM held in the DM's domain.

In a first embodiment, the ME may be configured to provide secure boot capabilities, and the THSM may be configured to provide full MTM capabilities. At power-on, the ME may securely boot. For example, the ME may perform a Non-TCG "secure" boot, such as per the open mobile terminal platform (OMTP) trusted execution environment TR0 specification. At boot time, the THSM may first build, for example by booting-up, the THSM DM's domain ($TD_{DM}$), and then build the "pristine" THSM DO's domain ($TD_{DO}$). If the DO and DU are separate, THSM may also build the THSM DU's domain.

The THSM $TD_{DM}$ may be built initially with pre-configured files protected in the THSM and made available at boot time. The THSM $TD_{DO}$ may be built largely with pre-configured files but may also be built using an RTO process. The THSM $TD_{DO}$ may go through a RTO protocol. This protocol may take the same form as the RTO protocol for the RO's domain ($TD_{RO}$) or it may be a different protocol. If the THSM $TE_{DO}$ does not go through a RTO protocol, the credentials needed to take ownership are pre-configured and pre-provisioned. The THSM $TE_{DO}$ may be owned by the DO. A DO may be an actual human user or owner, an organization such as an enterprise or its Information Technology (IT) department, or a remote Network Operator (NO).

The THSM $TD_U$ may be built with a pre-configured file pre-provisioned in the THSM $TE_{DO}$. The THSM's RO domain may be first built to a "pristine" configuration, according to the system-wide domain policy (SDP) of the THSM DO. The THSM's RO domain may go through a RTO process with the RO. The SDM of the DO's domain may manage the RTO process for the RO's domain, according to the SDP. If the THSM's RO is an MNO, so that the RO's domain is a MNO's domain, such a MNO's domain may also go through protocols that define i) how the MNO's domain can be registered to the MNO; ii) how subscription credentials (e.g. USIM or MCIM secret key Ki's and International Mobile Subscriber Identity (IMSI), etc) can be rolled-off from an MNO's mobile network to the MNO's domain on a THSM and then provisioned there; and iii) how once downloaded subscription credentials, functionality that handles or uses such credentials, or even the domain that provides subscription management functionality, may be migrated from one device to another. Such protocols may be referred to as i) a registration protocol; ii) a credential roll-off protocol; and 3) a migration protocol, respectively. The THSM's RO domain, after RTO is completed, may attest and report to the RO its own configuration.

In the first embodiment where the only trust-building mechanism that the ME may be capable of performing is doing a power-up time secure boot process, the ME configuration may not be further attestable by the ME or the THSM. Alternatively, the ME may perform a self-integrity check and produce an integrity value (IV) as it completes a secure boot. The ME may install software, such as engines for confidentiality and integrity protection, as per security mode features, such as UMTS security mode features, using an over the air (OTA) method. Optionally, when ownership of the RO's domain is taken via a RTO process with the RO, the RO may download or otherwise import and then assert its own policy regarding the conditions of the THSM that it may accept in order to allow the RTO process to complete. The RO's may be configured to "gate-keep" installing the domain for itself on the THSM platform when the RO agrees to the conditions of the overall THSM, the conditions of the building structure of the THSM's other domains, or both. Thus, as part of the RTO process, the RO may exchange some information with the SDM of the DO's domains to identify conditions or "domain-building plans" of the DO, and allow the RTO process to complete only if such conditions are acceptable to the RO. The RO domain may also have rights and may be configured to perform functionality to enforce such rights to allow it to be updated with, or notified of, any changes in the condition or domain building plan of the THSM after it has agreed to build its RTO-complete RO's domain on the THSM initially. The RO's domain-specific policy (DP) may specify the type of changes that the RO's domain may need to be notified of.

The SDM may initiate the RTO process for a RO domain associated with an intended RO. This may take place when the RO's domain is in a "pristine," "unclaimed" state. For example, the RO's domain may be named "Domain X" ($TD_X$) by the DO's domain and the DO. The domain may be created in a as-yet-unclaimed shell or a "pristine" condition. In such a case, the SDM can initiate an RTO process whereby it contacts the intended RO, on behalf of the domain $TD_X$. Once the RO has gone through an RTO process for this domain, the SDM may no longer initiate another RTO process for this same domain. Instead, the RO itself may initiate another kind of take-ownership process on this particular domain. Such a take-ownership process may differ from the RTO process specified so far, in that the former may be initiated remotely by the remote owner rather than locally by the owner/user of the device for the device itself (possibly under the coordination of the SDM or the DO's domain). The DO may retain authority to delete, destroy, or disconnect any RO's domain, even after the RO's domain has gone through an RTO process and is thus "claimed" or "owned" by the proper RO. However, the DO may, in general, not be able to know secrets stored within the RO's domain, or to know the interim computations or functions performed within the RO's domain.

Before the SDM initiates the RTO process for a pristine RO's domain, it may look up a list of available resources for domain building. The list may be held by the DM's domain. The SDM may also look up a "Desired Domains" list. The desired domains list may be held in the DO's domain $TD_{DO}$. The SDM may also look up the System Domain Policy (SDP), and the current state, including trust states, of the existing domains of the THSM and of the platform, which may be available for query from the DM's domain. This information may be used to decide if the desired RTO process for the particular RO's domain is possible under the available resources and policy, desired under the Desired Domains list, and allowed under the state, for example the trust state, of the existing domains of the THSM.

Alternatively, a remote owner's domain ($TD_{RO}$) may start and manage the RTO process on its own. The $TD_{RO}$ may be unclaimed and in a "pristine" condition before the RTO process. The "pristine" RO's domain $TD_{RO}$ may include pre-configured functionality that enables it to contact its intended RO upon boot up, and to start the RTO process autonomously. Optionally, the RTO process may be started after getting $TD_{RO}$ prompts the owner or user of the THSM and then gets a "nod" from the owner or user of the THSM to initiate the RTO process. A domain TD that was created and intended to be owned by a (target) remote owner RO_target but has not yet been owned via a RTO process and is still in a "pristine" state may be referred to as $TD_{RO\_target}$* hereinafter.

In another alternative, the $TD_{RO}$ may have gone through at least one RTO process with the particular RO and it may be currently "claimed" or "owned" by the RO. Whether the DO or its proxy on the THSM, such as domain $TD_{DO}$, may be allowed to start another RTO process for the same RO's domain may depend on the policy of the RO and/or the policy of the SDM. The SDM may examine the purpose of the RTO and, based on allowable purposes or activities within it policy structure, may decide whether to allow such a new RTO to proceed. The RO, via remote signaling, or the RO's domain ($TD_{RO}$), may initiate another RTO process for the domain with the same RO. This may take place when the RO needs to update configuration files, security policies, or executable code, in the $TD_{RO}$. The RO may download updates. Updates may be done over a non-RTO, over the air (OTA) update process. However, in some cases, the RO or the $TD_{RO}$ may use another RTO process to update some files or code.

When a "pristine" $TD_{RO}$ initiates the RTO process for itself, it may need to depend on the SDM to look up a list of available resources for domain building, which may be held by the DM's domain. The $TD_{RO}$ may also rely upon the SDM to look up a "Desired Domains" list, which may be held in the DO's domain, a System Domain Policy (SDP), and the current state, including trust states, of the existing domains of the THSM, which may be available for query from the DM's domain. This information may be used to decide if the desired RTO process for the particular RO's domain is possible under the available resources and policy, desired under the Desired Domains list, and allowed under the state or trust state of the existing domains of the THSM.

The SDM policy may be configured during the take-ownership (TO) process for the DO. This process may take place locally, via a pre-existing configuration structure which is enforced during the boot process. The DOs TO may also take place remotely; this process may be similar to a RTO process intended for use with take-ownership of domains that are not device owner's domains, as specified herein, except that SDM examination for blocking or allowing the RTO may not be invoked in the case of a TO process for the DO's domain, unlike in the case of the RTO process for non-device-owner remote owner. The SDP may be established during a DO take-ownership process which may be performed locally (with the DO physically present and interacting with the device) or in a way that involves remote interaction with a remotely located device owner. A component of the SDP is a list of allowable activities or purposes common to all non-DO domains. This list may also include additional entries specifying remote owners that are not allowed take ownership of domains.

In a second embodiment, the ME may have secure boot capabilities and may depend on the THSM to perform some of the "secure boot" checking of some of its boot code. The ME may perform a non-TCG secure boot, such as the OMTP TR0 secure boot. The THSM may be used to check the integrity of the ME so as to "utilize" the physical protection afforded to the THSM. For example, the ME may send raw data to the THSM and the THSM may check the integrity of the ME. The WTRU may implement a mechanism to provide a secure channel between the ME and the THSM, and a "somewhat trustworthy" part of the ME that can at least be trusted to send code or data to the THSM in a secure way and to communicate securely, such as over the secure channel, with the THSM, for the purpose of the THSM doing the integrity checking for the ME. The THSM may also store within it some of the ME's code on behalf of the ME. These codes may be loaded into the ME during the boot process. The THSM may take roles of performing the integrity check of the ME or storing and loading some of the codes for the ME because between itself and the ME the THSM may be a more trustworthy environment due to its hardware-based protection mechanism. In a third embodiment, the THSM may perform some of the secure-boot or integrity-checking for the ME's code. This may be attestable to the RO. The ME may include a single trusted entity; a Mobile Trusted Environment (MTE). An MTE may be a logically separate environment within the ME that is more trusted than the rest of the ME. An MTE may utilize some hardware based protection mechanisms such as hardware based roots of trusts (RoTs). After the base code of the ME is loaded, the MTE may be loaded. The MTE may be a trusted entity in the sense that it may provide proof of trust, such as use of a trusted signing key, to an external verifier. Although the MTE is a trusted entity it may not possess the core root of trust for measurement that is the measurement program code associated with an actual TPM. In so far as the ME, as a powered device, provides a "platform" on which the THSM may operate, the ME may be referred to herein as an ME platform. The MTE may be configured to collect evidence of the integrity of the ME platform and forward the evidence, under at least integrity protection afforded by use of a signing key protected within the MTE, to a trusted entity within the THSM such as a post-boot SDM. Since the THSM implements TCG TPM or MTM-like integrity measurement and verification functionalities, the THSM may also implement TCG TPM or MTM's capability to perform the 'Extend' operation, whereby measurements of current software are combined with the current values of Platform Configuration Registers (PCRs) that indicate the historic state of loading of software) to compute new values for the PCRs. The THSM may also implement a mechanism to convert the digest values (which would be the raw measurement values of integrity of software components) or the values of the PCRs to another integrity data that can be used for attestation of the trustworthiness of the ME platform toward the THSM. For simplicity, the gathered data of ME platform integrity may be denoted a ME Platform Integrity Data (MPID) hereinafter. The THSM may not maintain a domain for the ME or the MTE. The THSM may be able to acquire, either from a pre-configured file or by real-time contact with the DM, a certified metric against which it checks the calculated digest. Attestation of the ME may follow, provided a match is determined. An MTE may also be capable of collecting data that describes an "environment" of the ME, such as model numbers, what kind of services it is intended to perform and for whom. For simplicity, such environment description of the ME may be denoted ME Platform Environment Survey (MPES) hereinafter. The THSM DO's RO may attest to the integrity of both its own domain as well as the ME platform. This attestation may be similar to a Trusted Environment (TRE)'s M2ME Validation function, in the M2M context, as has been specified in PCT patent application WO 2009/092115 (PCT/US2009/031603). The ME may continually, on its own or upon request from the THSM, report its changing states to the THSM.

In a fourth embodiment, both the ME and the THSM may be configured to perform full MTM functionality. The trustworthiness of the ME, or its domains, may be attestable by the ME, or by the domains directly. The ME's RO domain may report its states on a continuing, or per-request, basis to the RO. The THSM's RO domain may function similarly. The reports by the ME's RO domain and the THSM's RO domain may be synchronized and also may be bound to each other. The reports also may be made using a common session of a protocol flow.

In this embodiment, the ME may be configured to perform several functions of the THSM as described herein. The ME may include one or more domains of its own, each with respect to a particular owner. These domains may include the properties of trusted entities as per the THSM. Such domains may include a device manufacturer (DM) domain and a user (U) domain. These domains may be pre-configured in a manner similar to the THSM. To distinguish domains on the ME from those on the THSM, the letters ME may be subscripted with those designating the domain itself. Thus the domain for the DM may be denoted $ME_{DM}$. The device owner (DO) domain on the THSM may monitor domains on the ME side to ensure conformance to the System-Wide Domain Policy (SDP) residing in the SDM. With the creation of each domain in the ME, communication with the SDM may make the THSM DO aware of each new domain configuration.

The ME may include a Domain Manager, which may be referred to as the platform domain manager ($ME_{PDM}$), that may function in a manner similar to that of the SDM in the THSM. The $ME_{PDM}$ may reside in the $ME_{DM}$ and initially may have a pre-configuration as defined by the DM. This initial configuration may be similar in its purpose and function to that of the initial, pre-configured definition of the $TD_{DM}$ on the THSM. The $ME_{DM}$ setup may be timed to occur after the $TD_{DO}$ is instantiated in the THSM. When SDM is notified that the setup for the $ME_{DM}$ is complete it may, depending on system-wide constraints, impose policy restrictions originating from or in reflection of the SDP. The SDM may maintain a list of a number of remote owners and their domains on the THSM. If a domain is to be created and managed on the ME that belongs to one of the owners in the list, then the SDM may have certain control over the creation and management of these domains on the ME.

In this embodiment, the ME may have full MTM functionality. Thus it may include a core root of trust for measurement (CRTM), a core root of trust for reporting (CRTR), and a core root of trust for storage (CRTS). On the THSM, domain subscription functionality may be managed by the TSIM function. If two domains, such as one in the THSM and the other on the ME, are for the same RO, the domain on the THSM may be used for functions or services for the RO that require very high-level of security and/or trust, such as subscription function and its management for that remote owner, while the domain on the ME may be used for functions or services for the same RO that may still require certain level of security or trust but not to the same level required for the functions and services expected from the domain on the THSM. Domains that are not built from pre-configured files may be configured through the remote take ownership (RTO) process. The RTO for the ME, for a typical remote owner (RO), may be similar to those for the THSM.

Domains on the ME may not be intended to be used for subscription management for remote owners. Instead, they may be intended to be used to perform computation and resource-intensive tasks for the benefit of the user, owner, remote owner, or any combination thereof. For example, these domains may perform tasks that may not be practicable for the relatively limited resources on the THSM. Domains on the ME may also be more "ephemeral" or "temporary" in the sense that, instead of being once created and then staying inside the ME until explicitly deleted, these domains may be created on boot or even on run-time sessions, in analogy to the virtualization, and be used for their specific purposes on a temporary, session-based basis. A remote owner of a domain on the ME may not have the same level of privilege in terms of requesting and obtaining an attested survey of the allocation of resources and purposes thereof of the other domains on the ME owned by other remote-owners or such other domains on the THSM.

It is advantageous to provide a method for a device owner of a mobile trusted platform to buy a "blank" WTRU which is not pre-allocated and initialized by a specific PLMN, also known as the MNO remote owner, to allow an arbitrary choice of mobile network operator without restrictions. The method may include performing a take-ownership process, such as the RTO process, of a WTRU, such as a UMTS device (UE), where the remote owner is the PLMN operator, or other similar operator for whom the subscription application is intended, and setup, customize and finalize a subsystem, such as a RO's domain, which is a domain inside a THSM and may be claimed by the correct RO.

As previously noted, a Trusted Hardware Subscription Module (THSM) may be built as, or include within it, a tamper-resistant hardware component module that includes functionality for a subscription application for PLMN operators and other value-added services, such as the IMS Subscription Identity Module (ISIM). A THSM may be removable or irremovable from the WTRU. An enhanced version of a UICC or a smart card compliant to the Global Platform standards may be one embodiment of such a THSM.

Figure 3:
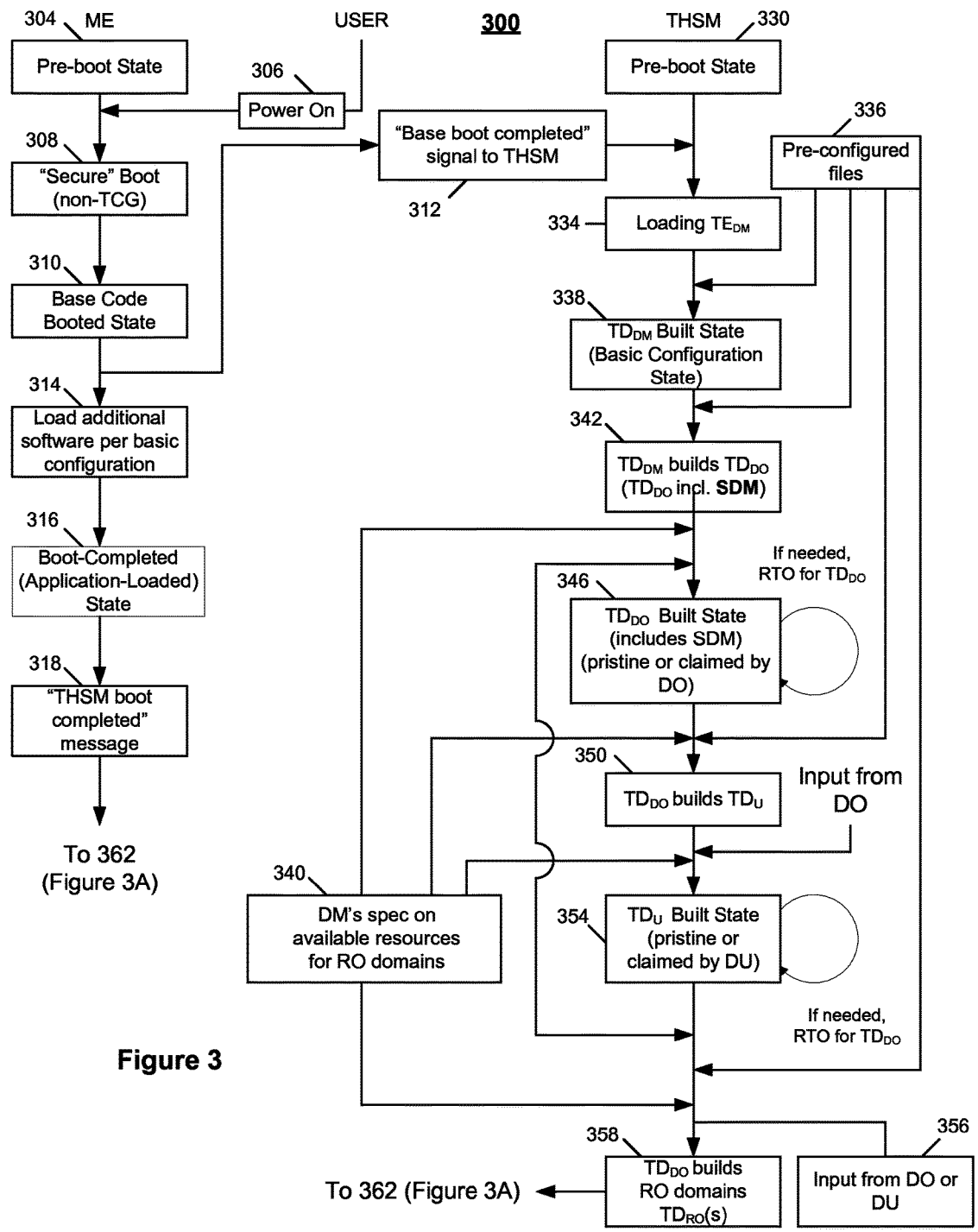
FIGS. 3 and 3A illustrate an exemplary boot up and process for taking ownership of a domain.
Figure 3A:
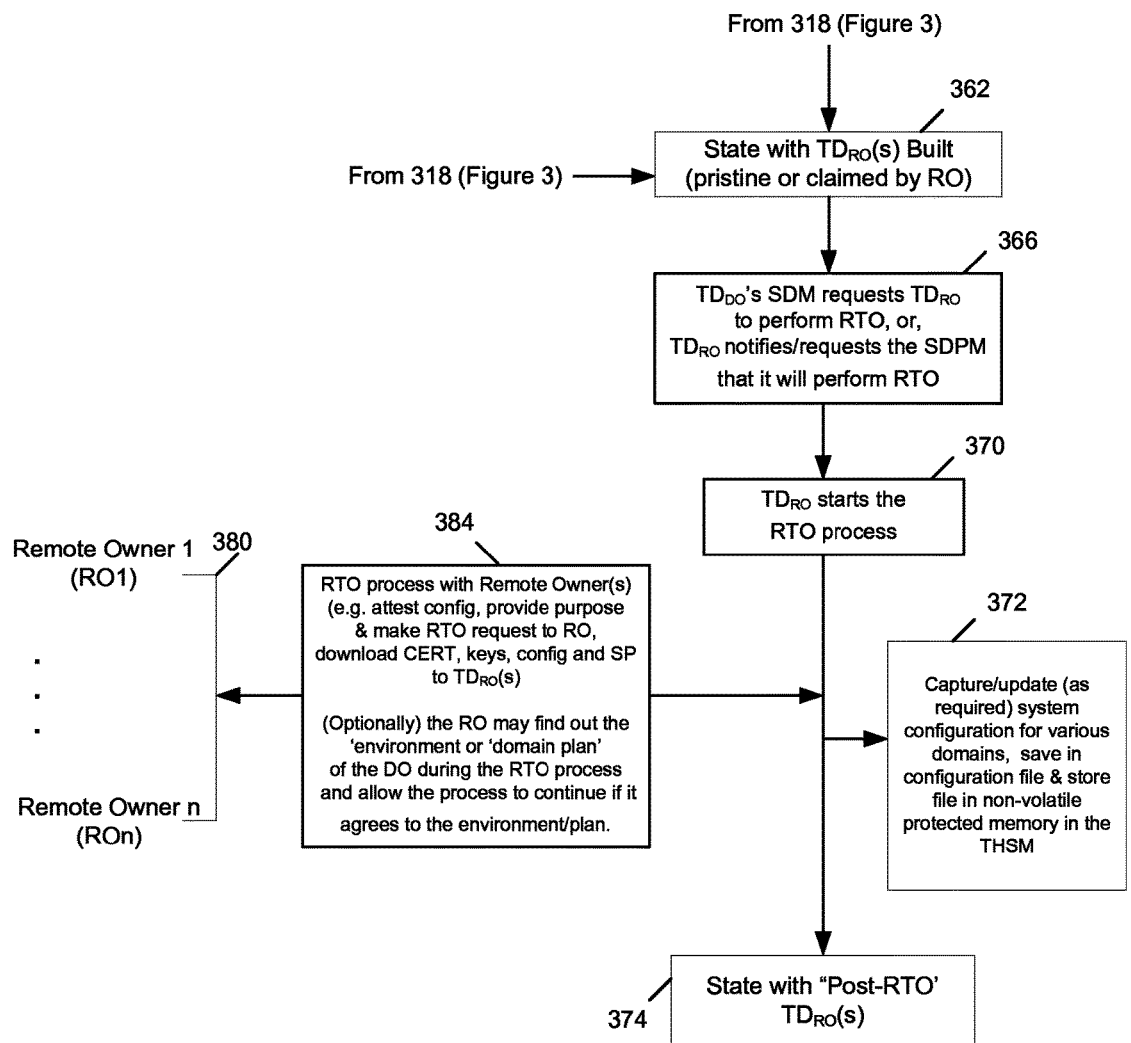

The take-ownership operation builds the basic "trust" relationship between an operator or PLMN and the WTRU. This procedure may install and instantiate a "blank trusted" TSIM comprising a "pristine" engine with a generic "trusted" software configuration. This subsystem may be "certified" by the remote owner, if the platform is able to provide evidence of its "pristine" configuration and security attributes. FIGS. 3 and 3A illustrates an example of this process as it specifically relates to the first embodiment described herein. The remote owner may be the mobile network that provides the user a requested service, sets up the appropriate security policy, and enforces a device configuration that is consistent with the service. The owner for this protocol may be local.

FIGS. 3 and 3A illustrate an exemplary boot up and RTO process. The ME may have a pre-boot state 304. The device may be powered on at 306. The ME may perform a "secure" boot (non-TCG) at 308. The ME may reach a base code booted state 310. Further, the ME may send a "base boot completed" signal to THSM at 312. The ME may load additional software per a basic configuration at 314. The ME boot may be completed (application-loaded) state at 316. The ME may send to the THSM a boot completed message at 318.

The THSM may be in a pre-boot state 330. The THSM may load $TE_{DM}$ at 334. The THSM may receive pre-configured files during configuration, for example, 336 illustrates the use of pre-configured files. At 338, the THSM may reach a "$TD_{DM}$ build" state (basic configuration state). The THSM may receive DM's specification on available resources for RO domains, for example, as illustrated at 340.

At 342, the $TD_{DM}$ may build $TD_{DO}$ ($TD_{DO}$ may include SDM). At 344, the THSM may use saved configuration files, for example, to build domains (may be available due to previous RTO's). At 346, the THSM may reach a $TD_{DO}$ build state (includes SDM), where $TD_{DO}$ may be unclaimed or claimed by DO. At 350, the $TD_{DO}$ may build $TD_U$. At 352, input may be received from the DO. At 354, the THSM may reach a $TD_U$ build state, where $TD_U$ may be unclaimed or claimed. At 356, the THSM may receive input from the DO or DU (e.g., specifying which domains the DO may want to build, by file or interaction). At 358, the $TD_{DO}$ may build RO domains, $TD_{RO}$'s.

Referring now to FIG. 3A, at 362, the THSM may reach a state with $TD_{RO}$ built, where $TD_{RO}$ may be unclaimed or claimed by an RO. At 366, the SDM may request the $TD_{RO}$ to perform an RTO, or, the $TD_{RO}$ may notify (or request) the SDM that it will perform an RTO. At 370, the $TD_{RO}$ may start the RTO process. At 380, there are representative remote owners ($RO_1 \ldots RO_n$). At 384, information may be exchanged. For example, as part of the RTO process with a remote owner, information exchanged may include one or more of: attestations, configurations, policies, purposes, certificate (referred to as CERT herein), keys and SP to $TD_{RO}$'s. Optionally, the RO may find out the 'environment' or 'domain plan' of the DO during the RTO process and may allow the process to continue if it agrees to the environment/plan.

At 372, the THSM may capture/update system configuration for various domains, save the information and store the information in non-volatile protected memory in the THSM. At 374, the THSM may reach a state with post-RTO $TD_{RO}$'s.

Referring to the first embodiment, the policy domain formed by the RTO of the DO may comprise stipulations that affect domain configurations of subsequent RTO processes. The RTO protocol may be appropriate for a non-DO RO. A domain-specific policy (DP) may be downloaded during a RTO transaction. The DP for the DO may differ from the DP for a RO, in that, such a DP ($DP_{DO}$) may include a System-wide Domain Policy (SDP) intended for use for building and maintaining the other domains, which may be remotely owned, in the THSM. Before or during an RTO process, the RO of the domain may obtain, from a trusted third party (TTP), a Reference Integrity Metric ($RIM_{RO}$) for the configuration and current integrity state of the hardware or software supporting all or a subset of all of the Domains of the THSM, and may be expressed as:

$$\text{TTP} \rightarrow \text{RO: RIM}_{RO} = \{\text{Configuration and state of the HW/SW supporting Domains of the THSM, and/or digest values}\}. \quad \text{Equation 1}$$

In some cases, a TTP may be able to provide $\text{RIM}_{RO}$ for a subset of the HW and SW of the THSM, including the domains, which the RO is interested in verifying. More than one TTP may be needed to provide $\text{RIM}_{RO}$s, which the RO collects and forms a collective reference metric. A target domain of THSM ($\text{TD}_{RO\_target}$) undergoing a RTO process may be configured to, with the aid of the SDM of the THSM, provide its RO a signed THSM Platform Integrity Attestation (TPIA). The TPIA may be a concatenation of individual Integrity Attestations of the domains on the THSM and/or the integrity attestation of the platform of the device that the RO of the target domain is interested in verifying before allowing the completion of the RTO process with the of the $\text{TD}_{RO\_target}$. The target domain of THSM ($\text{TD}_{RO\_target}$) may be, with the aid of the SDM of the THSM, able to provide its RO a signed THSM Platform Environment Summary (TPES). A TPES may include a summary of the environment of the THSM, including the number and nature of the other domains on the THSM and any remaining available resources, such as the resources of the platform of the THSM, that could be used for the benefit of the $\text{TE}_{RO\_target}$, and may be expressed as:

$$\text{TD}_{RO\_target} \rightarrow \text{RO:} \quad [\text{TPIA}]_{signed} \parallel [\text{TPES}]_{signed}. \quad \text{Equation 2}$$

Alternatively, instead of reporting a TPIA which may comprise all the attestations across all domains of interest to the RO the SDM may provide a signed statement, which may be a semi-autonomous statement, that it has checked the integrity of all such domains and deems them to be trustworthy. This attestation may include local verification of the integrity of the collection of domains. A local verifier may include a valid configuration list for each domain on the THSM. The SDM may provide the local verifier with the TPIA which may be signed by an AIK. The verification of the individual integrity attestations may require that they match with the corresponding locally stored entries in the configuration list. The SDM may perform the integrity measurements, logging and extensions to PCRs necessary to construct a TPIA and prove the trustworthiness of each domain. These measurements, and their extensions, may be used by the verifier to establish that attestation for the required domains has taken place.

Once verification has been achieved the local verifier may prepare a statement that the relevant attestations have taken place and signs this statement with a private key from a certified key pair ($K_{sign\_verify\_priv}$, $K_{sign\_verify\_pub}$). The message comprising the signed Verification Statement concatenated with the signed TPES may be expressed as:

$$\text{TD}_{RO\_target} \rightarrow \text{RO:} \quad [\text{Verification Statement}]_{Ksign\_verify\_priv} \parallel [\text{TPES}]_{signed}. \quad \text{Equation 3}$$

Upon receiving the $\{\text{RIM}_{RO}\}(s)$ from the TTP(s), and the signed TPIA and signed TPES from the $\text{TD}_{RO\_target}$, the RO may verify if the $\text{TD}_{RO\_target}$ is in an environment, such as an environment in the THSM, that the RO finds agreeable for the purpose of continuing the RTO process, and the hardware or software supporting the $\text{TD}_{RO\_target}$ and any other domains of interest to the RO, are in a state whose integrity is agreeable to the RO.

The RTO protocol for a pristine domain may begin at power up. Optionally, the RTO protocol may begin after a power-up. When secure boot of the THSM completes the resulting build of the domains may be determined by the configuration file whose contents reflect either the platform's state at initial, such as the first, power-on time, or that of a previous state when the device had been previously booted up and then powered down. Thus the device could be in the basic configuration that includes the $\text{TD}_{DM}$ build, "pristine" $\text{TD}_{DO}$, and "pristine" $\text{TE}_U$ states. Alternatively, the WTRU may be in a later configuration, for example, a configuration based on a previous boot-up and domain building or RTO processes that includes the $\text{TD}_{DM}$, "post-RTO" $\text{TD}_{DO}$, and "post-RTO" $\text{TE}_U$ states. In another alternative, the WTRU may be in a configuration that also includes an expanded set of additional domains, such as those shown in FIG. 2. Such domains may have been created during a previous powered session and ownership may have been taken by respective owners by a previously run RTO processes that took place during the previous sessions.

Referring to the first embodiment, as the secure and trusted entity of the platform, the THSM may control the take-ownership protocol and determine whether or not the ME is in an initial trustworthy state. The pre-provisioned key $K_{temp}$ may be used to protect the confidentiality of messages sent across the THSM-ME interface. For simplicity an encrypted message A, may be denoted by $\{A\}$, signing of a message may be denoted by [A], and the notations $\text{ID}_{ME}$ and $\text{ID}_{THSM}$, respectively, represent pre-provisioned temporary IDs of the ME and THSM.

RTO initiation may include the SDM of the $\text{TD}_{DO}$ initiating a RTO for an "unclaimed," "pristine" domain intended to be claimed by a RO after the RTO process with that particular RO. The user may initiate a power-on of the ME platform. At power on, the ME may perform a "non-TCG" "secure boot," such as the boot defined by OMTP, of base codes in which it comes "alive." As part of the non-TCG secure boot process, the integrity of the base codes of the ME may be autonomously checked.

Referring to the third embodiment, the Mobile Trusted Environment (MTE) may be loaded following the completion of the base code boot process. With the use of a signing key the MTE may attest to the integrity of the ME platform configuration.

The ME, after loading the base codes, may periodically send a signal to the THSM, indicating that is has booted to a minimum secure setting. Since the THSM's DO's domain may not have yet booted when the signal is sent, the ME may send the same signal, with a different random nonce (nonce_1), until it receives an acknowledgement signal back from the DO's domain of the THSM. This signal may be expressed as:

$$\text{Def) Package\_1} = \text{"ME Base Code Boot completed" MSG} \parallel \text{nonce\_1} \parallel \text{ID}_{ME} \quad \text{Equation 4}$$
$$\text{ME} \rightarrow \text{THSM's TD}_{DO}\text{: Package\_1} \parallel [\text{SHA-X(Package\_1 )}]_{Ktemp\_1}.$$

Referring to the third embodiment, the signaling may be expressed as:

Def) Package_1 = "ME Base Code Boot completed & MTE loading" MSG || nonce_1 || $ID_{ME}$
ME → THSM's $TD_{DO}$: Package_1 || [SHA-X(Package_1 )]$_{Ktemp\_I}$.

Equation 5

The THSM may boot "securely," such that the THSM may have loaded its DM's domain, a "pristine" DO's domain, a User's domain, and at least one "pristine" domain that is meant to be owned, but may not yet be owned, by an RO. Also, in loading these domains, the integrity of each of the domain's code states may be checked against reference integrity metrics (RIMs) of each of the domains. The checking may be performed according to a specification, such as the TCG MPWG specification.

The Device Owner's domain ($TD_{DO}$) may be loaded to either a "pre-configured" configuration or to a "Last-saved (post-previous-RTO)" configuration, if it has previously gone through a RTO process for the DO. The DO's domain, when loaded, may include a System-wide Domain Manager (SDM). The SDM may supervise the building or loading and maintenance of domains to belong to other remote owners (ROs). The SDM may look up a "list of resources available for domains" from the DM's domain, and, may also look up the System-wide Domain Policy (SDP), which the $TD_{DO}$ protects.

At boot time, the SDM may also prompt the human user or the human owner (DO) of the THSM with a "list of domains that can be built" and request input to choose the domains to be built. After getting that input from the user or owner, the SDM may proceed to build only those domains specified in the response from the human owner or user. The SDM may interact with the ME to provide the user interface (UI) for these transactions.

After the secure boot, the THSM's $TD_{DO}$ may send a "THSM boot completed" message to the ME. Within the message, $TD_{DO}$ may also include an externally disclose-able summary of the current state of the domains, such as the number and names of the RO's domains loaded. The SDM of the $TD_{DO}$ may determine and enforce the extent of the external disclosure of the summary of the current state of the domains, and such determination may be based on the SDP and/or the domain-specific policies (DPs) of the domains on the THSM and/or the ME. The $TD_{DO}$ may acknowledge receipt of the Package_1 in this message, by including the received nonce_1 as part of the SHA-X integrity check code input, which may be expressed as:

Def) Package_2 = "THSM boot completed" MSG || nonce_2 || $ID_{THSM}$
$TD_{DO}$ → ME: Package_2 || [SHA-X(Package_1 || nonce_1)]$_{Ktemp\_I}$ Equation 6

The ID of the THSM, such as $ID_{THSM}$, may be kept in the DM's domain $TD_{DM}$ and may be equivalently an ID of the $TD_{DM}$. The DO's domain $TD_{DO}$ may fetch it from $TD_{DM}$ to construct Package_2 in Equation 6.

In response to the "THSM boot completed" signal, the ME may continue to complete its boot process. After completing its boot process, the ME may send to the THSM's $TD_{DO}$ a message that may be expressed as:

Def) Package_3 = "ME boot completed" || nonce_3
ME → $TD_{DO}$: Package_3 || [SHA-X(Package_3 || nonce_2 )]$_{Ktemp\_I}$ Equation 7

The following applies to the case where the SDM of the DO's domain initiates and supervises the RTO process for a currently "pristine" RO's domain.

After the $TD_{DO}$ receives the Package_2 from the ME, an RTO process may be initiated. The System-wide Domain Manager (SDM) within the $TD_{DO}$ may initiate the RTO process by requesting a "pristine" target RO's domain ($TD^*_{RO\_Target}$) to start a RTO process. The SDM may initiate this process autonomously or when prompted by a human owner or user. The SDM may send the $TD^*_{RO}$ a request to start the RTO process for the target RO. The request may include who the target RO is, such as the RO's ID or Network Access Identifier (NAI), and the validity period of the current request. Either as part of the request or as a separate package that goes along with the request, the SDM may also send a list of "SDP's Conditions for Allowed RO's Domains" (referred to SCARD hereinafter).The SDM may also send a "Target Domain Plan" for the $TD_{RO}$ when it is completed after the intended RTO process. This messaging may be expressed as:

Def) Package_4a = Request_to_start_RTO || SCARD || Target Domain Plan || nonce_4
SDM → $TD^*_{RO\_Target}$: Package_4a || [SHA-X(Package_4a)]$_{Ksign\_SDM}$.

Equation 8

The $TD^*_{RO\_Target}$, in response to receipt of the Package_4, may either accept or reject the request. This request may be interpreted as an "offer" to allow the RO to take ownership of the RO's domain. The $TD^*_{RO\_Target}$ may make the decision based on a pre-configured criteria or its own "pristine" version of the RO's Domain Policy which had been loaded. The $TD^*_{RO\_Target}$ may be configured to examine the Request_to_start_RTO, SCARD, and Target_Domain_Plan, and make such decisions, in the absence of and for the benefit of, the actual target Remote Owner. This may be expressed as:

Def) Package_5a = Okay(or Not_Okay)_to_start_RTO || nonce_5a
$TD^*_{RO\_Target}$ → SDM:
Package_5a || [SHA-X(Package_5a) || nonce_4]$_{Ksign\_TD^*RO\_Target}$.

Equation 9

The "pristine" target RO's domain ($TD^*_{RO\_Target}$) may initiates this process. The $TD^*_{RO\_Target}$ may alert the SDM of its "final domain plan" for the RTO process. The SDM may grant or reject the request. If the SDM grants the request, the $TD^*_{RO}$ can start the RTO process, which may be expressed as:

Def) Package_5b = Intend_to_start_RTO || Final Domain Plan || nonce_5b
$TD^*_{RO\_Target}$ → SDM: Package_5b || [SHA-x(Package_5b) ]$_{Ksign\_TD^*RO\_Target}$.

Equation 10

In response to receipt of either Package_5a or Package_5b, the SDM may look up, for the RTO process for $TD^*_{RO\_Target}$, the System Domain Policy (SDP), which may be pre-configured or obtained by a RTO process for $TD_{DO}$, a list of "Desired Domains," which may be either pre-configured or supplied by the Owner, a list of "Available Resources for Domains," which may be held and continuously updated by the DM's domain, or the current state of the domains in the THSM.

The SDM may also evaluate whether there are sufficient resources, such as memory or computing resources for virtual machine threads, available for building or maintaining multiple domains on the THSM, whether the current state of the domains in the THSM match those specified in the "Desired Domains" list, whether the building or loading of any new domains in the "Desired Domains" is supportable by the current state of the domains in the THSM and also allowed under the SDP, or whether one or more of the domains need to go through RTO processes.

If the SDM determines that $TD^*_{RO\_Target}$ can go through a RTO process according to the available resources, the current state of the existing domains of the THSM, and the SDP, the SDM may indicate this determination ($TD^*_{RO\_Target}$) and proceed to prepare for a number of integrity attestations to be forwarded, during the RTO process, to the RO for its evaluation of the $TD^*_{RO\_Target}$ and its surrounding domains. This may be expressed as:

Def) Package_6 = Okay_to_go_ahead_with_RTO || nonce_6  
SDM → $TD^*_{RO\_Target}$:  
Package_6 || [SHA-X(Package_6) || nonce_5(a or b)]$_{Ksign\_SDM}$.

Equation 11

The SDM may indicate to the human user that it is about to initiate a RTO process for a particular domain by, for example, messages displayed on the WTRU. The SDM may also prompt the human user or human owner (DO) with a list of "desired domains to start the RTO process and the desired RO" and proceeds to initiate the RTO processes for only those RO's domains that the owner or user specifies in response to the prompt. The SDM may interact with the ME that provides the user interface (UI) for these transactions.

The $TD^*_{RO\_Target}$ may request the SDM to prepare material that it may use to construct THSM Platform Integrity Attestation (TPIA) and a THSM Platform Environment Summary (TPES). This may be expressed as:

Def) Package_7 = Request_for_TPIA || Request_for_TPES || nonce_7  
$TD^*_{RO\_Target}$ → SDM:  
Package_7 || [SHA-X(Package_7) || nonce_6 ]$_{Ksign\_TD*RO\_Target}$.

Equation 12

Referring to the third embodiment, the request may be expressed as:

Def) Package_7a = Request_for_TPIA || Request_for_TPES || Request for MPID || Request for MPES || nonce_7a  
TD*RO_Target → SDM:  
Package_7a || [SHA-X(Package_7a || nonce_6)]Ksign_TD*RO_Target.

Equation 13

In the requests for the TPIA and TPES, the RO may specify what kind of information regarding the TPIA and TPES it seeks from the SDM. For example, for the TPIA, it may specify the names or ranges of the domains, other than itself, which it wishes to verify the integrity of Likewise, for the TPES, the RO could specify the public IDs, such as the network allocation identifiers (NAIs), of the Owners of the domains other than itself.

Referring to the third embodiment, the target RO may also request specific information regarding the integrity of the ME platform (referred to as MPID hereinafter) and other information concerning the ME environment. Alternatively, the RO may request a simple indicator that the MTE was loaded and the MPID and MPES were sent by the ME to the SDM. The MTE, the trusted entity residing in the ME platform, may prepare the values MPID and MPES when it requested to do so by the SDM. This request may be expressed as:

Def) Package_7b = Request for MPID || Request for MPES || nonce_7b  
SDM → MTE:  
Package_7b || [SHA-X(Package_7b) ]Ksign_SDM.

Equation 14

The MTE may gather configuration data from the ME and build the MPID. Environment data may also be acquired to produce a ME Platform Environment Survey (MPES). These values may be based on the current ME state which can change over time. Updated values may be sent to the SDM if and when future requests are made following ME state changes. In general the MTE may send a response to the SDM that may be expressed as:

Def) Package_8a = MPID || MPES || Cert$_{MTE}$  
MTE → SDM:  
Package_8a || [SHA-X(Package_8a || nonce_7b) ]Ksign_MTE.

Equation 14

The MTE may provide a certificate, which may be signed by a CA, that includes its public key $K_{MTE\_Pub}$. Thus the SDM may verify the authenticity of this public key through the verification of the CAs signature and thereby check the integrity of the message from the MTE with $K_{MTE\_Pub}$. The SDM may prepare the TPIA and the TPES and later forward them to the $TD^*_{RO\_Target}$.

For the preparation of the TPIA, the SDM may collect integrity attestations, such as integrity attestation of and by the "pristine" $TD_{RO}$, integrity attestation of and by the $TE_{DM}$, integrity attestation of and by the $TE_{DO}$, integrity attestation of and by the $TE_U$ (if device user is different from the DO), and integrity attestation of and by any other existing $TD_{RO}$'s the RO is interested in.

Alternatively, the SDM may verify, after collecting the integrity values from the PCRs, by a process of local, autonomous check and re-calculation of the measurement logs, such as the code and data, the domains against the digest values from the PCRs for the respective domains. This may be performed when the TTP (PCA) is not aware of the latest codes that should comprise the respective domain, and the TTP can certify a signing key linked to an AIK that is certified for the TPM, or MTM, on the WTRU. The TTP may not be configured to provide the reference values for the digest metric that the RO can use to compare the TPIA from the SDM. The SDM may check, locally, if the PCR quotes it gets for the domains are up to date, by recalculating the digest of the codes for the domains and comparing them with the quoted PCR values. On a condition that this local check has passed, the SDM can then sign the TPIA and pass it to the $TD_{RO\_target}$ and to the $RO_{target}$ by way of MTE, or the ME.

In another alternative, a 3-way verification, the SDM may provide, as part of the TPIA, the digests and the measurement logs, such as the actual codes, of the domains. The RO, when getting the codes along with the digests, may get the reference metrics for the digests from the TTP, may recompute the digest from the measurement logs, and may compare it with the quoted PCR digests it received from the $TD_{RO\_Target}$ as well as the reference metric of the digest it received from the TTP.

The TPIA, with or without the measurement logs, may also include an indication of the "local time" when the PCR quote has taken place, effectively time-stamping the quotes for the digests for the individual domains. This gives some indication of when the last time each of the domain's PCR digests has been obtained by the SDM. If the measurement log is not sent to the RO, a time-stamped quote of the PCRs may provide some additional information to the RO, when it needs to verify the attestation indicated in the TPIA, in terms of deciding whether the time when the local digests have been obtained and included in the TPIA is recent enough to allow use of it in the attestation verification. The clock being used for such time-stamping, may be a trustworthy clock.

In the event that the 3-way verification fails, the RO may request that the TTP provide it with updated reference metrics or measurements logs from which it can compute the desired digests. The RO may retry the 3-way verification. If the verification is successful the RTO continues. If it fails and successful 3-way verification is required by the RO policy the RTO may be terminated.

For integrity attestation of the DO's domain, the SDM may obtain it autonomously, such as through a native function of the SDM. For integrity attestations, except for that of the DO's domain, the SDM may request the respective other domains to produce and sign its own respective integrity attestation. In the request, the SDM may include authorization data, such as a token, that the recipient can use to check if the SDM has the authority to request and obtain the integrity attestation from the domain. The Request may also include the range of the Platform Configuration Registers (PCRs) of the recipient domains that the Target RO, and SDM, as a forwarder of the Target RO's request, needs to check for integrity of the recipient domain. This request may be expressed as:

---

Def) Package_8b(i) = Request_for_Attestation || nonce_8b(i), i=1,2,...,N     Equation 15
SDM → $TD_{Domain(i)}$:
    Package_8b(i) || [SHA-X(Package_8b(i))] $_{Ksign\_SDM}$.

---

Each of the domains, denoted as domain(i), i=1, 2, ..., N, where N is the number of domains the SDM collects the PCR values from, first checks the authorization data in the Request_for_Attestation, and then fetches the PCR values of the range of PCRs as specified in the Request_for_Attestation. This operation may be expressed as:

---

Def) Package_8c(i) =     Equation 16
Values of the specified range of PCRs || nonce_8c(i), i=1, 2, .., N
$TD_{Domain}(i)$ → SDM:
    Package_8c(i) || [SHA-X(Package_8c(i) || nonce_8b(i)] $_{Ksign\_TD\_Domain(i)}$.

---

The SDM may perform THSM Platform Integrity Attestation (TPIA) to concatenate all of the attestations and sign it with its signing key. This may be expressed as:

---

Def) TPIA = Concatenation{ signed PCR values from Domain(i)}, i=1,2,..,N.     Equation 17

---

For the preparation of the TPES, the SDM may produce TPES by concatenating information it gathers from the $TD_{DM}$, $TD_{DO}$, and $TD_{Domains(i)}$, such as THSM HW and SW configuration and version numbers, which may be obtained from the DM's domain, BIOS configurations, number of domains on the platform, total platform resources, such as memory, used up for the current domains, platform resources remaining for further building or expansion of existing or new domains, names of the domains, or names or IDs, such as NAIs, of their owner (if allowed by the respective domain owners), date/time, or a monotonic counter value if such is available but not the date/time, when the above environment information was collected by the SDM, any other pertinent information. This request may be expressed as:

---

Def) TPES = { collected information}     Equation 18

---

The SDM may sign the TPIA and TPES and forward them to the $TD^*_{RO\_Target}$. The SDM may also include a signed SCARD so that the DO may not need to rely on any pristine $TD^*_{ROget}$ if it was not able to examine the SCARD. The SCARD may be sent, along with the TPIA and TPES, to the RO, so that the RO can make the decisions to go ahead with the take-ownership after examining the SCARD, TPIA, and TPES. This messaging may be expressed as:

---

SDM → $TD_{RO\_Target}$:     Equation 19
SCARD || nonce_8fb || [SHA-X(SCARD) || nonce_8fb)] $_{Ksign\_SDM}$
TPIA || Concatenation{nonce_8c(i)} [SHA-X(TPIA) || Concatenation{nonce_8c(i)}] $_{Ksign\_SDM}$,
TPES || nonce_8f || [SHA-X(TPES || nonce_8f)] $_{Ksign\_SDM}$
OR
    SCARD || TPIA || TPES || [SHA-X(SCARD|| TPIA||TPES||nonce_8f] $_{Ksign\_SDM}$.

---

Upon receiving the TPIA, the TPES, and the SCARD, from the SDM, the $TD^*_{RO\_Target}$ may check their integrity by checking them with the SDM's public signing key. Then, the TPIA, TPES, SCARD, a purpose information element (P) that indicates the services desired by the user, and a request for take-ownership message (request_TO), may be sent to the ME. If the RTO process is for a domain that has to be provisioned for a full TSIM capability, a signed certificate about the TSIM functionality ($Cert_{TSIM}$) may also be prepared and sent along with the above package.

There may be two or more certificates used for the TSIM functionality. One for the pristine TSIM functionality ($CERT^*_{TSIM}$) and the others for those that are fully instantiated or updated. The certificate for the pristine TSIM functionality may be modularly embedded in the certificate structure for the DM, for example, it may be plugged into the pristine domain that is a functionality from the DM.

When the RO performs a RTO process after the $TD_{RO}$ has gone through at least one RTO beforehand, then it may no longer needs to send the $CERT^*_{TSIM}$ since this certificate would only be appropriate for use with a pristine domain, which the $TD_{RO}$ no longer may be. Thus, in this case, the RO may send an updated certificate $CERT_{TSIM}$.

The content may be encrypted with the public key of the Target RO (K_Target_RO_pub), which may have been made available, for example, by a certificate transfer or by pre-configuration, in case the target RO is already known when the pristine $TD^*_{RO\_Target}$ is loaded, prior to the usage by the $TD^*_{RO\_Target}$. The TSIM may be pre-provisioned with a signing key $K\_{TSIM-Sign}$. The public key of this private signing key may be pre-distributed to the target RO. $ID_{ME}$ is the ID of the ME, which the $TD^*_{RO\_Target}$ obtains from the THSM DM's domain $TD_{DM}$, which securely holds the ME ID. This may be expressed as:

Def) Package_9 =                                         Equation 20
SCARD || TPIA || TPES || P || Request_TO || Cert$_{TSIM}$ ||
$ID_{ME}$ || nonce_9
$TD^*_{RO\_Target}$ → ME:
  {Package_9}$_{K\_Target\_RO\_Pub}$ ||
  [SHA-X(Package_9)]$_{K\_TSIM-SIGN}$.

Referring to the third embodiment, the values MPIA and MPES may be added to the message. The MPIA may include a digest computed in the THSM based on the configuration data (MPID) compiled by the MTE. This digest may be attested to only if it checks with the acquired certified metric pre-existing in a configuration file or delivered via real-time communication with the DM. As per the RO request for integrity and environmental information, equation 20 may comprise a simple indication that the SDM successfully received MPID and MPES. This may be expressed as:

Def) Package_9 = SCARD || TPIA || TPES || MPIA ||        Equation 21
MPES || P || Request_TO ||Cert$_{TSIM}$ || $ID_{ME}$|| nonce_9
$TD^*_{RO\_Target}$ → ME:
  {Package_9}$_{K\_Target\_RO\_Pub}$ ||
  [SHA-X(Package_9)]$_{K\_TSIM-SIGN}$.

The ME may transfer the entire message above to the RO, which may be expressed as:

ME → Target RO:                                 Equation 22
           {Package_9}$_{K\_Target\_RO\_Pub}$ ||
           [SHA-X(Package_9)]$_{K\_TSIM-SIGN}$.

Referring to the third embodiment, the message would include MPIA and MPES.

The RO may decrypt the Package_10 using its private key $K_{Target\_RO\_Priv}$, check the ID of the ME, and interpret the messages. The RO may interpret the SCARD and see if it can "agree" to these conditions from the SDP. If the RO agrees to the SCARD, the value TPIA from a pristine $TD^*_{RO\_Target}$, for example, may be interpreted to represent the entire initial TSIM state before any service credentials or configuration controls are provided to the Target RO's domain $TD^*_{RO\_Target}$. The value P may be interpreted as indicating the services desired by the user. The Target RO, which may be a MNO in the case of a TSIM-enabled $TD^*_{RO\_Target}$, may verify the integrity of the domains of its interest as indicated in the TPIA by comparing it with the Reference Integrity Metrics (RIM) values ($RIM_{RO}$) it has independently obtained from a TTP.

The MNO may have the capability to know the expected value of the TPIA through a certificate provided by the supplier of the WTRU/THSM, for example, to the TTP. Referring to the third embodiment, the expected values of MPIA and MPES may be known ahead of time through a certification process made possible by the fact that the MTE is a trusted entity, where its trustworthiness has been attested to by the THSM.

The target RO may look up the received TPES and evaluate whether the $TD^*_{RO\_Target}$ is in a THSM system whose "surrounding system environment," for example as represented by the TPES, is "agreeable" to the target RO, in the context of the RO allowing itself to proceed further with the RTO process.

After checking the TPIA, TPES, the purpose P, the Request_TO, and, with reference to the third embodiment, the MPIA and the MPES, the Target RO, such as the MNO, may determine that the pristine $TD^*_{RO\_Target}$ that is requesting to be "taken ownership" by the Target RO, as well as THSM at large that includes the $TD^*_{RO\_Target}$, is sufficiently "trustworthy" to let it proceed further for the RTO process and also to let it grant the $TD^*_{RO\_Target}$ to interact with it to provide some pre-designated basic services.

To perform take-ownership of the $TD^*_{RO\_Target}$ so that the domain can then later download the keys, fuller configurations, parameters and executables and install them to become more functional than the basic "pristine" state allows, and also become claimed or owned and managed by the Target Remote Owner (RO), the Target RO may send a Configuration signal (CONFIG) that may include executables. The RO also sends a RIM for the TSIM, called $RIM_{TSIM}$, which may match the post-installation state if the $TD_{RO\_Target}$ installs the configurations, parameters, and executables according to the received CONFIG. The $RIM_{TSIM}$ may be stored in secure memory on the $TD^*_{RO\_Target}$ and may be used to check the integrity of the TSIM function at a future boot time. A domain policy (DP), which specifies the security measures to be employed as well as other configuration issues, may be included in the transaction.

The RO-specific domain policy (DP) may be different from the System-wide Domain Policy (SDP) that is held by the SDM and represents a plan for building and managing one or more domains owned by a specific RO on the THSM. The RO-specific DP may comprise policies or plans that govern only the intra-domain applications and security measures specific and exclusive to that particular domain.

Some ROs may make their DPs in such a way so that the DP may also include provisions that place restrictions regarding what other ROs are "agreeable" to be built or managed on the THSM. For example, a mobile network operator (MNO_A) may make his $DP_{MNO\_A}$ in such a way that its target domain ($TD_{MNO\_A}$), after downloading and installing the $DP_{MNO\_A}$, would be governed by a set of restrictions on, for example, its services or activations, if some of the conditions specified in the $DP_{MNO\_A}$ regarding the state and nature of the some of the other domains on the THSM are not found to be satisfactorily met. For example, a MNO may implement $DP_{MNO\_A}$ whereby the $TD_{MNO\_A}$ will disable its TSIM functions if the $TD_{MNO\_A}$ finds out, after surveying the larger environment within THSM, that there are other MNO's domains, with activated TSIM functions of their own, installed and active on the same THSM.

The $TD^*_{RO\_Target}$ may be required to configure itself in a way that corresponds to the requested services in P. For example, the RO may send a response to the ME, where the message confidentiality is protected using the public key $K_{TSIM-Pub}$. The ME may transfer this message to the $TD^*_{Target\_RO}$ on the THSM. $Cert_{RO}$ may include the public key $K\_RO\text{-}_{priv}$ of the Target_RO. The RO may send, at this time, a reference integrity metric (RIM) for the TSIM. The RO response may be expressed as:

$$\text{Def) Package\_10} = \quad \text{Equation 23}$$
$$\{\text{CONFIG, DP}_{RO}, \text{ID}_{RO}, \text{RIM}_{TSIM}\}K_{TSIM\text{-}Pub} \;||\; \text{Cert}_{RO} \;||$$
$$\text{Cert}_{TSIM} \;||\; \text{nonce\_10}$$
$$\text{Target RO} \rightarrow \text{ME:}$$
$$\{\text{Package\_10}\}_{K\_RO\text{-}Priv} \;||\; [\text{SHA-X(Package\_13}||$$
$$\text{nonce\_9})]_{K\_TSIM\text{-}SIGN}.$$
$$\text{ME} \rightarrow \text{TD*}_{Target\ RO}: \quad \text{Equation 24}$$
$$\{\text{Package\_10}\}_{K\_RO\text{-}Priv} \;||\; [\text{SHA-X(Package\_13}||$$
$$\text{nonce\_9}]_{K\_TSIM\text{-}SIGN}.$$

The $TD^*_{RO\_Target}$ may decrypt the message with the private key $K_{TSIM\text{-}Priv}$ and verify the RO signature using the public key $K_{RO\text{-}Pub}$ in the $\text{Cert}_{RO}$ after checking that certificate with a CA. It may securely store the received reference integrity metric $\text{RIM}_{TSIM}$ for the TSIM application. It may check the ID of the RO, from $\text{ID}_{RO}$, then check the policy $\text{DP}_{RO}$ of the RO and determine if it can proceed with the rest of the configuration and installation of the CONFIG. $TD^*_{RO\_Target}$ may perform reconfiguration via CONFIG to reach a "complete" domain state and then executes a self-test to determine if the measured metric of its TSIM function matches that communicated by the network and represented in the $\text{RIM}_{TSIM}$. The domain $TD_{RO\_Target}$ is now "completed" and is no longer "pristine," hence the removal of the asterisk * in the notation. This may be expressed as:

$$TD^*_{Target\ RO}: \text{check DP}_{RO}, \text{store RIM}_{TSIM}, \text{and install} \quad \text{Equation 25}$$
$$\text{CONFIG.}$$
$$\rightarrow$$
$$TD_{Target\ RO}: \text{RO's domain is "complete"}.$$

The completed domain $TD_{Target\ RO}$ may send a "RTO success and domain completed" status message to the ME, which it may forward to the Target RO. This may be expressed as:

$$\text{Def) Package\_11} = \{\text{"domain completed"} \;||\; \quad \text{Equation 26}$$
$$\text{ID}_{RO\_Target}\}_{K\_RO\text{-}Pub} \;||\; \text{nonce\_11}$$
$$TD_{Target\ RO} \rightarrow \text{ME}:$$
$$\text{Package\_11} \;||\; [\text{SHA-X(Package\_11} \;||$$
$$\text{nonce\_10})]_{K\_TSIM\_SIGN}.$$

Optionally, the ME may send a status message to the user, for example, displayed to the screen of the WTRU, that the phone is now ready for registration and credential roll-out.

The ME may forward the status message to the RO that the reconfiguration of the platform has successfully completed and is ready to register for TSIM credentials. The $TD_{RO}\_Target$ has achieved "THSM_$TD_{RO}$_LOAD_COMPLETE" state. This message may be expressed as:

$$\text{ME} \rightarrow \text{Target RO}: \quad \text{Equation 27}$$
$$\text{Package\_11} \;||\; [\text{SHA-X(Package\_11} \;||$$
$$\text{nonce\_10})]_{K\_TSIM\_SIGN}.$$

This RTO protocol may serve as a precursor to the protocol for registering a subscriber, as the owner or user of the THSM, to a 3G UMTS network operator that provides the subscribed service, and also a later protocol for downloading and provisioning of credentials for the authentication and key agreement (AKA), which include downloading and provisioning of the shared secret K and the subscriber identity IMSI.

The certificates, $\text{Cert}_{TSIM}$ and $\text{Cert}_{RO}$, for the public-private key set may be delivered in the messages in which they are used. Alternatively, the RO's domain ($TD_{RO}$) and the RO may acquire their respective certificates from a trusted third party. This acquisition may be expressed as:

$$\text{TTP} \rightarrow \text{ME} \rightarrow TD_{RO}: \quad \text{Cert}_{RO} \quad\quad \text{Equation 28}$$
$$\text{TTP} \rightarrow \text{RO}: \quad \text{Cert}_{TSIM}.$$

In another alternative, the RO's certificate $\text{Cert}_{RO}$ may be delivered from the network to the ME and the THSM's certificate $\text{Cert}_{TSIM}$ may be delivered from the ME to the network before the delivery of messages in which they are used. Thus communications may be sent before the encrypted messages described herein, these communications may be expressed as:

$$\text{ME} \rightarrow \text{RO}: \quad \text{Cert}_{TSIM} \text{ (before message of step 9 is sent)} \quad \text{Equation 29}$$
$$\text{RO} \rightarrow \text{ME}: \quad \text{CERT}_{RO}\text{(before message of step 13 is sent)}.$$

For each of these alternative certificate methods of delivery, an entity ID may accompany the messages in which the public encryption keys are used.

In another alternative, using symmetric keys instead of public keys may be employed to protect the confidentiality of messages. In each instance the sender may generate a symmetric key $K_s$, for example, using a pseudo-random number generator (PRNG), and use this key, not the public key, to protect the confidentiality of the message. The symmetric encryption key may also sent to the recipient along with the encrypted message, where it is protected with the public key. Thus the recipient is able to access the key $K_s$ with its private key and then use it to decrypt the message.

Referring to the second embodiment, the THSM and ME may differ from those of the first Embodiment. The THSM, instead of the ME itself or a trusted entity within the ME such as a MTE, may be configured to perform an integrity check of some or all of the codes of the ME when ME boots. Optionally, the THSM may also store some or all of the boot codes for the ME. The THSM may not be configured to attest to the ME's integrity to an outside evaluator. It may be configured to perform a "local" check of the integrity of the ME codes at boot time.

An integrity value for the ME may be used in the boot-up process, and may not be used in the RTO process. The integrity measurement of the ME, denoted by meas_ME, which represents the ME code and configuration state resulting from a secure boot of the ME, may be obtained by the THSM's DM's domain $TE_{DM}$. The THSM's $TD_{DM}$ may check the validity of meas_ME, but it may not incorporate it in the platform attestation.

Referring to the fourth embodiment, the ME may be a trusted ME in the sense of, for example, the TCG MPWG. The ME may include a mobile trusted module (MTM) and can be trusted due to having the MTM as its trust anchor providing root of trusts for storage, reporting, measurement, verification, and enforcement.

Figure 4:
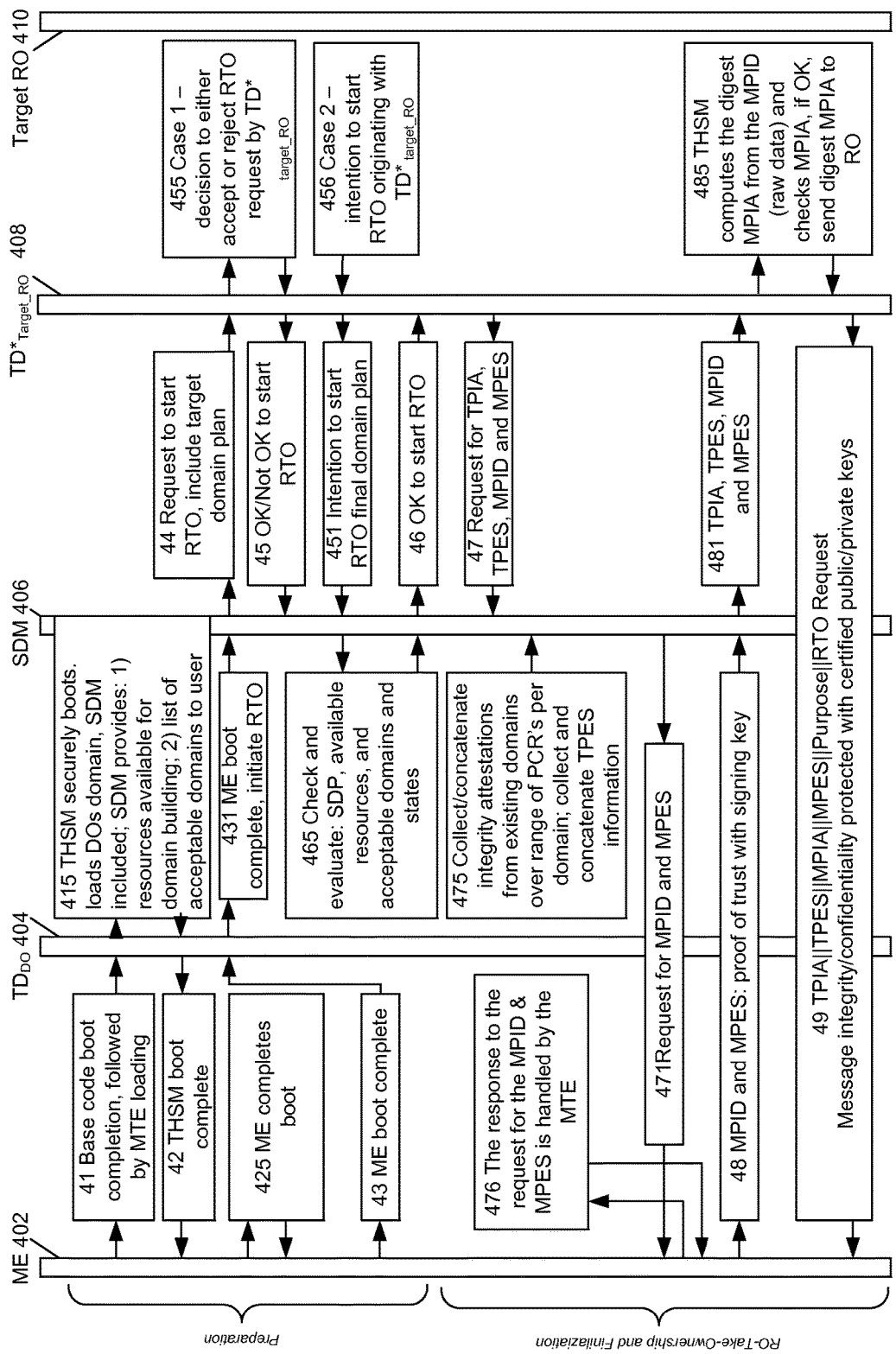
FIGS. 4 and 4A illustrate an exemplary call flow diagram for a process of taking ownership of a domain.
Figure 4A:
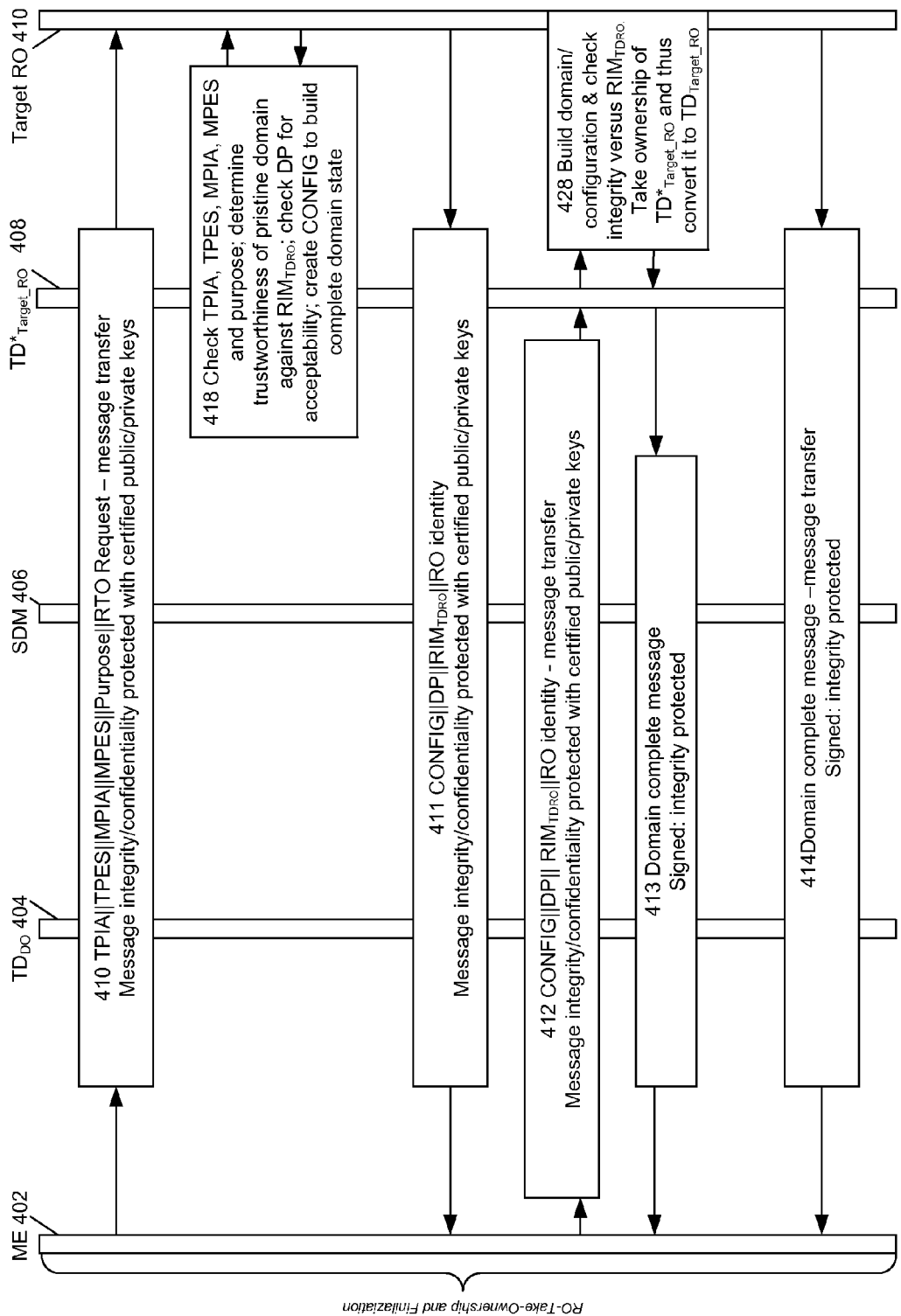

FIGS. 4 and 4A illustrate an exemplary call flow diagram for a Remote Take-Ownership process. For example, FIGS. 4 and 4A illustrate exemplary calls between one or more of ME 402, $TD_{DO}$ 404, SDM 406, $TD^*_{Target\_RO}$ 408 and Target RO 410. The arrows in FIGS. 4 and 4A may represent the origin/destination of a call.

As shown in FIGS. 2 and 3, the SDM may include the system wide domain manager which resides in the THSM and provide part of the DO's functionality. The SDM may have oversight and coordination of all domains setup in the device to ensure that all such domains would operate and interact with each other compliant to the SDP, and according to the domain-specific policies, in so far as any conflicts in such policies would be attempted to be reconciled by the SDM on behalf of the DO and the ROs of the other domains. The $TD_{DO}$ may include the mandatory device owner domain in the THSM. The $TD_{DO}$ may include the SDM and thus it may maintain the system level domain policy. The MTE may include the policy manager $ME_{PDM}$ for the ME side. The $ME_{PDM}$ may perform the policy manager function on the ME but may be subject to the oversight of the SDM in the THSM. The $ME^*_{Target\_RO}$ may include the pristine domain setup for remote ownership by an allowed remote owner. The target RO may include the remote owner requesting ownership of ME*Target_RO.

The ME may assume full MTM functionality so that remote take ownership of domains on the ME by recognized remote owners is supported. Similar to that of the RTO described in reference to the first embodiment; they differ essentially by virtue of the ultimate policy control exercised by the SDM over the $ME_{PDM}$ for those domains owned by the same remote owners on both the THSM and the ME. Thus the formation and management of any ME domain that is owned by the same remote owner who also owns a domain on the THSM must occur in a manner that conforms to the policy of the SDM.

Still referring to FIG. 4, a base code boot may be completed by ME 402 at 41. At 415, the THSM may securely boot. The THSM may load DO's domain, SDM included; where the SDM may provide: 1) resources available for domain building; and/or 2) a list of acceptable domains to user. At 42, the THSM may complete its boot. At 425, the ME may complete its boot. At 43, the ME may indicate that its boot is complete. During this process the DM's domain may be built, an optional user domain ($ME_U$) may also be built, and available resources are checked. The DM's domain may include the $ME_{PDM}$ which provides the initial configuration and specification of the domain policy for the ME device. By virtue of the pre-configuration of the $ME_{DM}$, this policy may be made to be consistent with that of the SDP in regard to the policies for those domains, such as the ones on the THSM and others on the ME, with common remote owners, between the ME domain and the THSM domain.

Still referring to FIG. 4, the ME, with its pre-configured domains, may send a "boot complete" message at 431 initiating an RTO. This message may comprise explicit information about DM domain policy and available resources in the ME. At 44, a request to start RTO, including target domain plan, may be sent. At 455, a decision may be made by $TD^*_{Target\_RO}$ 408 to either accept or reject the RTO start request. At 45, a message may be sent indicating whether the RTO should be started. Alternatively, at 456, an RTO may originate with $TD^*_{Target\_RO}$ 408. At 451, $TD^*_{Target\_RO}$ 408 may send an "intention to start RTO final domain plan."

The SDM may react to the ME boot message by evaluating the THSM's system-wide domain policy (SDP) and determining what restrictions are to be imposed or allocated on the ME domains. These policy restrictions may include what domains, as per their associated remote owners, are allowable, on the ME and the THSM. The SDM may determine what system-wide resources the ME is allowed to use for the domains owned by the same remote owner who has domains on the THSM, including those of which he has been made aware of. The $ME_{PDM}$ may receive this information via the message in Equation 7. The SDM may also include the policy restrictions to its base policy and allowable resources to its resource list. After the $ME_{PDM}$ receives the information, then it may exercise certain privileges in terms of making and enforcing decisions regarding management of the resources and domains on the ME without requiring to get permissions from the SDM for all such decisions.

Still referring to FIG. 4, the process may continue at 465. At 465, the following may be checked and/or evaluated: SDP, available resources, and/or acceptable domains and/or states. At 46, an "OK to start" signal may be sent. At 47, a request for TPIA, TPES, MPID and MPES may be sent. At 475, SDM 406, for example, may collect/concatenate integrity attestations from existing domains over a range of PCR's per domain, and/or collect and/or concatenate TPES information.

At 471, a request for MPID and MPES may be sent. At 476, the response to the request for MPID and MPES may be handled by the MTE. At 48, the MPID and MPES may be sent with a proof of trust, with a signing key. At 481, the TPIA, TPES, MPID and MPES may be sent from SDM 406 to $TE^*_{Target\_RO}$ 408. At 485, the THSM may compute the digest MPIA from the MPID (raw data) and check the MPIA. If acceptable, the digest MPIA may be sent to the RO. At 49, a request may be sent for TPIA∥TPES∥MPIA∥MPES∥Purpose∥RTO.

Referring to FIG. 4A, and continuing the RTO process, at 410, the TPIA∥TPES∥MPIA∥MPES∥Purpose∥RTO message may be sent to Target RO 410. At 418, Target RO 410, for example, may perform one or more of the following: check TPIA, TPES, MPIA, MPES and purpose; determine trustworthiness of pristine domain against RIMTDRO; check DP for acceptability; or create CONFIG to build complete domain state.

An alternative to the above is for $TD^*_{Target\_RO}$ 408 to request a simple indication from the SDM of the trustworthiness of the ME instead of MPIA and MPES; in that case, the SDM provides TPIA, TPES, and the ME trustworthiness indication. The SDM, however, still requests and receives MPIA & MPES from the MTE.

Still referring to FIG. 4a, at 411, message CONFIG∥DP∥$RIM_{TDRO}$∥RO may be sent. At 412, the CONFIG∥DP∥$RIM_{TDRO}$∥RO message may be transferred. At 428, a domain may be built and configured, and, integrity may be checked versus $RIM_{TDRO}$. In addition, ownership may be taken of $TD^*_{Target\_RO}$ thus converting it to $TD_{Target\_RO}$. At 413, a domain complete message may be sent. At 414, the domain complete message may be transferred.

Figure 5:
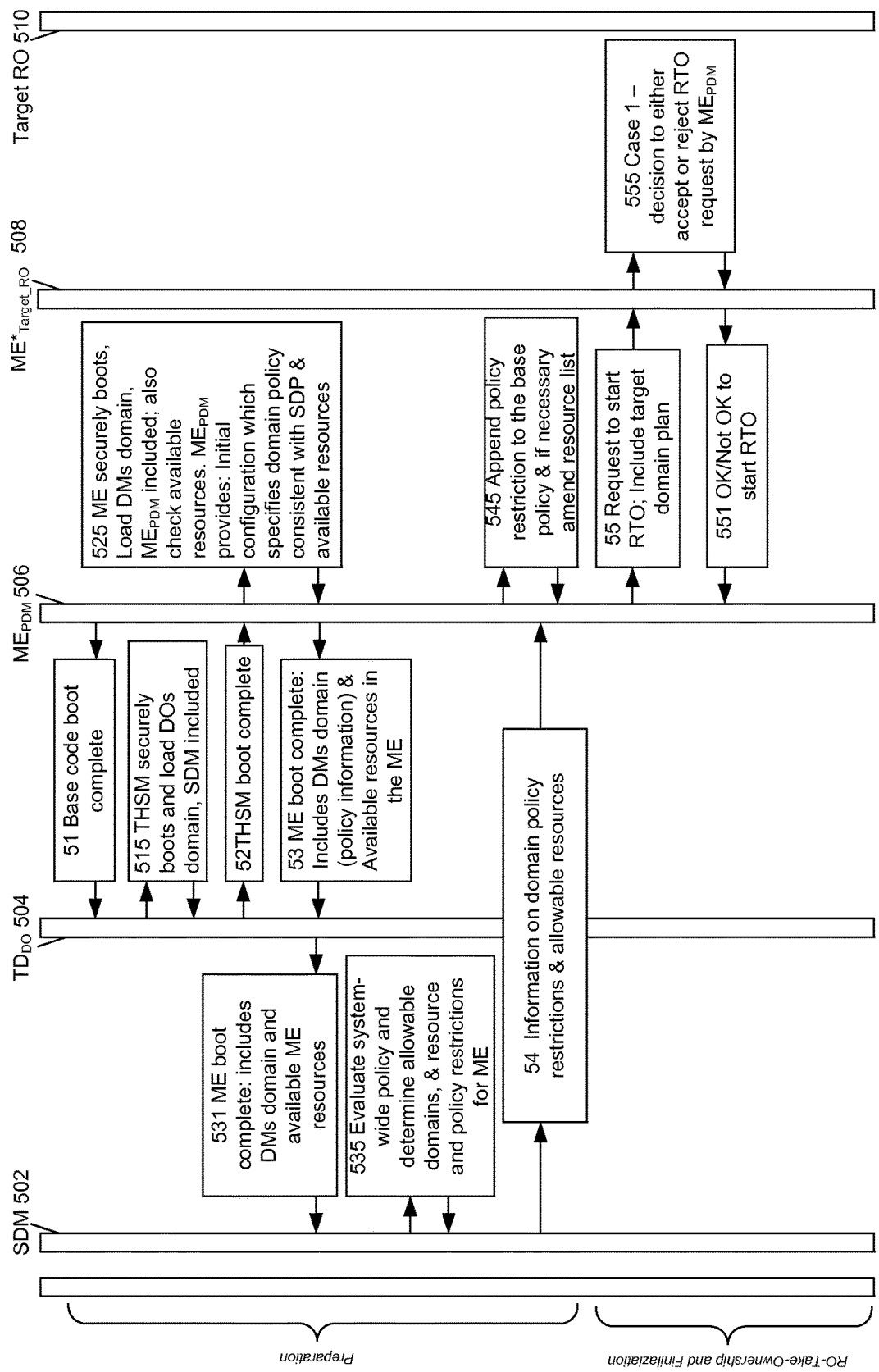
FIGS. 5 and 5A illustrate an exemplary call flow diagram for a process of taking ownership of a domain with full attestation.
Figure 5A:
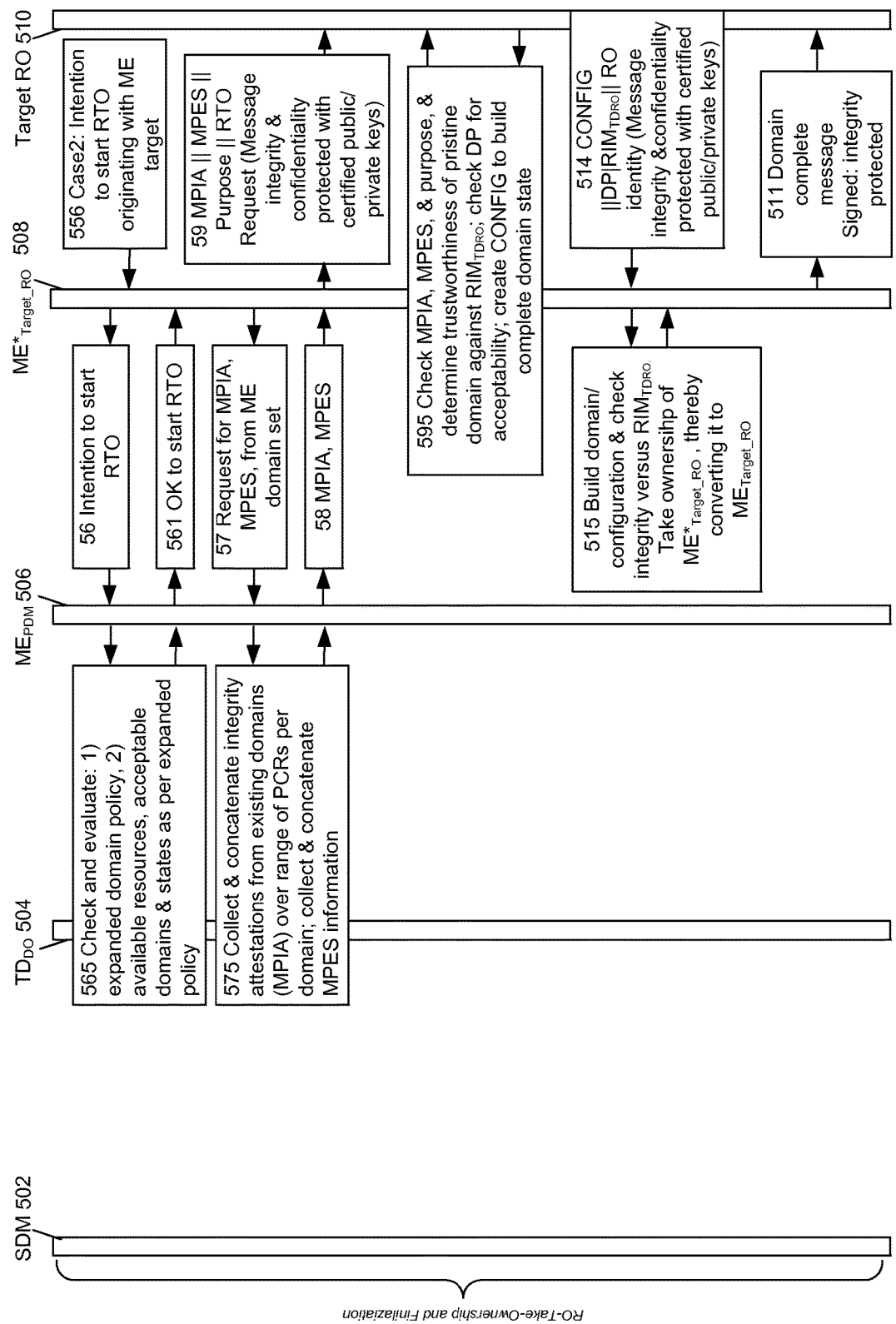

FIGS. 5 and 5A illustrate an exemplary call flow diagram for a Remote Take-Ownership with full attestation (e.g., relating to the fourth embodiment). For example, FIGS. 5 and 5A illustrate exemplary calls between one or more of SDM 502, $TD_{DO}$ 504, $ME_{PDM}$ 506, $ME^*_{Target\_RO}$ 508 and Target RO 510. The arrows in FIGS. 5 and 5A may represent the origin/destination of a call. At 51, a base code boot complete message may be sent. In response, at 515, the THSM may securely boot and load the DOs domain, including the SDM. At 52, a THSM boot complete message may be sent. In response, at 525, the ME may securely boot, which may include loading the DMs domain, $ME_{PDM}$ included; as well as checking available resources. The $ME_{PDM}$ may provide an initial configuration that specifies domain policy consistent with SDP and available resources. At 53, a message may be sent that the ME secure boot is complete, including the DM's domain (policy information) and available resources in the ME. At 531, the "ME boot is complete" message may be transferred to SDM 502. At 535, SDM 502, for example, may evaluate system-wide policy and determine allowable domains, resources and policy restrictions for the ME. At 54, a message may be sent providing information on domain policy restrictions and/or allowable resources. At 545, a policy restriction may be appended to the base policy, and, if necessary, the resource list may be amended.

Elements 55-511 of FIGS. 5 and 5A may be similar to elements 45-414 as shown in FIGS. 4 and 4A. The evaluation of the values MPIA and MPES may be similar to those in equations 14 through 19. The ME may be MTM capable and it may be configured to compute the digest MPIA by itself, not just raw data MPID. The updated policy restrictions conveyed by SDM may be checked such that no prohibited domains or domains policies are realized. The policy check and evaluation may be performed by the $ME_{PDM}$.

At 55, a request to start a RTO may be sent, which may include a target domain plan. At 555, a decision may be made to either accept or reject the RTO request by $ME_{PDM}$. At 551, a message may be sent indicating whether the RTO should be started. In an alternative, at 556, an intent to start RTO may originate with ME target. At 56, an intent to start RTO message may be sent. At 565, the following may be checked and/or evaluated: 1) expanded domain policy; and/or 2) available resources, acceptable domains and states as per expanded policy. At 561, a message may be sent indicating that it is acceptable to start the RTO. At 57, a request for MPIA and MPES, from ME domain set, may be sent. At 575, collections and concatenations of integrity attestations from existing domains (MPIA) over a range of PCRs per domain may be performed, as well as collection and concatenation of MPES information. At 58, the MPIA and MPES may be sent. At 59, a MPIA∥MPES∥Purpose∥RTO request may be sent (message integrity and confidentiality may be protected with certified public/private keys). At 595, Target RO 510, for example, may perform one or more of the following: check MPIA, MPES and purpose; determine trustworthiness of pristine domain against $RIM_{TSIM}$; check DP for acceptability; or create CONFIG to build complete domain state. At 514, message CONFIG∥DP∥$RIM_{TSIM}$∥RO may be sent. At 515, a domain may be built and configured, and, integrity may be checked versus $RIM_{TDRO}$. In addition, ownership may be taken of $ME^*_{Target\_RO}$ thus converting it to $ME_{Target\_RO}$. At 511, a domain complete message may be sent (signed, integrity protected). The ME may communicate directly with the Target RO so that no message transfers, such as those shown in FIGS. 3 and 3A, may be used, and the number of messages may be reduced. The details regarding the required certificates for public/private key exchange in the messaging between the ME and the Target RO along with those regarding RIM certificates for pristine engine trustworthiness verification are not shown in FIG. 5.

Figure 6:
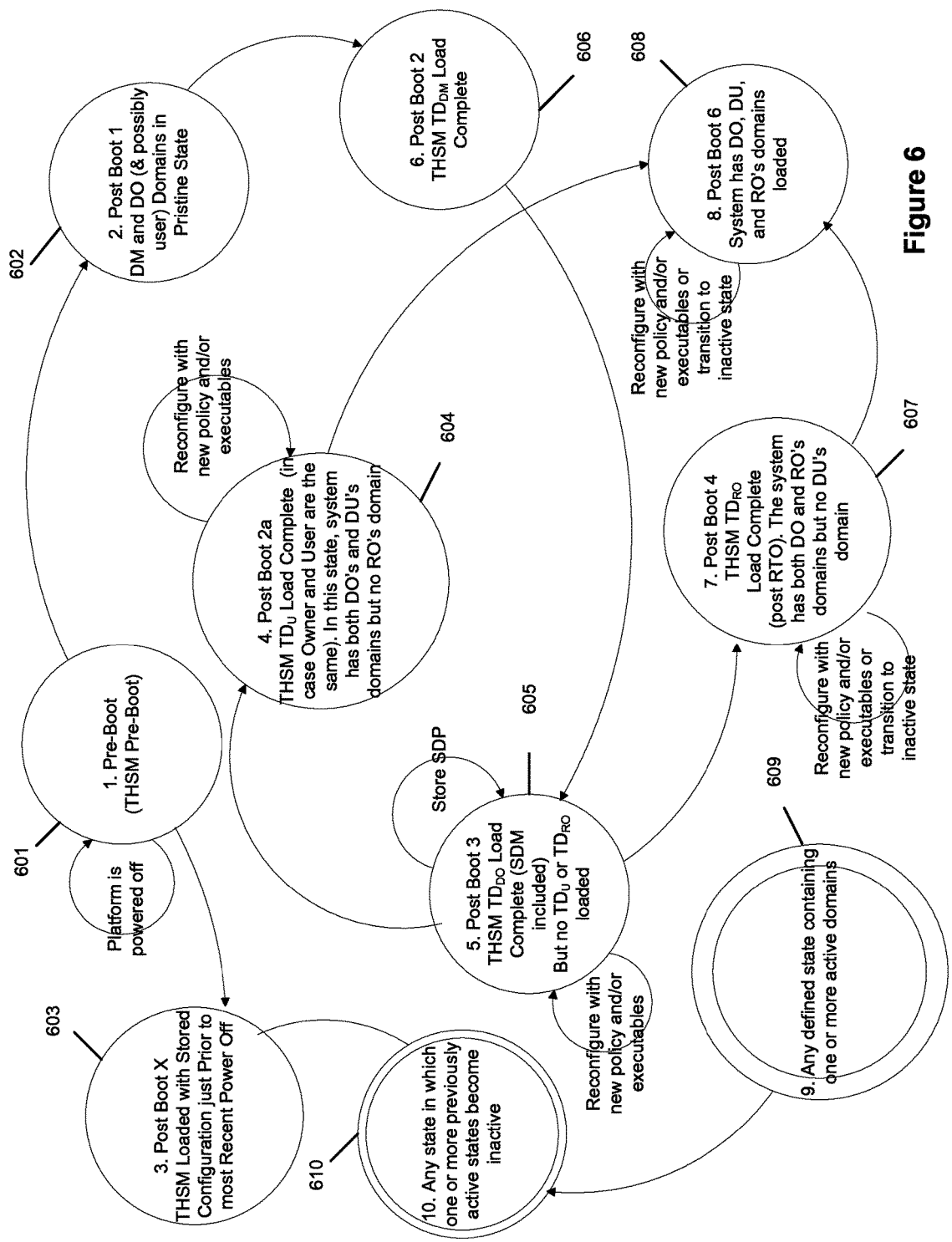
FIG. 6 illustrates exemplary state definitions, transitions, and control point definitions of one embodiment of a trusted hardware subscription module.

FIG. 6 illustrates exemplary state definitions, transitions, and control point definitions of the THSM. As an example, the lifecycles for the M2M Communication Identity Module (MCIM), whose definition and basic functionality has been defined in PCT patent application WO 2009/092115 (PCT/US2009/031603), have been defined herein. The THSM may improve and generalize the functionality and features, including state definitions and transitions, of the MCIM.

At 601, the THSM may be in a pre-boot state. A first user may power on the THSM, the THSM may securely boot and the THSM may be at state 602. At 602, a DM and DO may exist in a pristine state. The DM domain may be built from a pre-configured file and the THSM may be at state 606. At 606, the THSM is in a post boot 2 state, where the $TD_{DM}$ may be loaded. From 606, a DO domain may be built from pre-configured or downloaded files, leaving the THSM at state 605. At 605, the THSM may be in a post boot 3 state, where the $TD_{DO}$ domain may be built, however, a $TD_U$ or $TD_{RO}$ may not be loaded. From state 605, a DOs domain (SDM) may load a user's domain, leaving the THSM at state 604. At 604, the THSM may be in post boot state 2a, where $TD_U$ is loaded, but RO domains may not be loaded. From state 605, a pristine RO domain may be built based on the SDP, leaving the THSM at state 707. At 707, the THSM may be in post boot state 7, where a $TD_{RO}$ and $TD_{DO}$ have been loaded, however, a $TD_U$ may not be loaded. From state 607, $TD_{DO}$ (SDM) may load $TD_U$, leaving the THSM at state 608. At 608, the THSM may have DO, DU and RO domains loaded.

From state 601, a user may power on and the THSM may securely boot, leaving the THSM at state 603. At 603, the THSM may be loaded with a stored configuration, where the stored configuration was the configuration prior to the most recent power off. From state 603, a post boot transaction may take place that changes a configuration, leaving the THSM at state 610. At 610, the THSM is in a state where one or more previously active states become inactive. Similar to the process of arriving at state 610 from 603, the THSM may be in a state 609, where the THSM has one or more active domains. From state 609, a transition may take place as a result of a configuration changing event, leaving the THSM again at state 610.

At states 604, 605, 607 and 608, the THSM may be reconfigured with new policy and/or executables or transition to inactive state. In addition, at state 605, an SDP may be stored.

In a first method for domain management, the policy from a domain owner, i.e., the system-wide domain policy (SDP) may be very restrictive and "static," and may have hard rules about new domain activities or purposes. These policies may tend to alleviate the need to communicate to the ROs every new domain entry or existing domain updates.

In a second method for domain management, the SDP may be less restrictive and allow more flexibility in terms of activities and purposes. Every new domain entry and every domain change may be reported to the existing domain owners. This may result in a more dynamic system of policy enforcement in which initial and follow up negotiations between platform and RO can take place.

Referring to the first method for domain management, the SDP may specify the domains that are allowed without exception in a pre-configured list. This list may comprise information regarding the types of RO's and how many (for each type) are allowed. The list may also include the kinds of services the ROs can provide once they have their domains set up. A prospective RO may be one that meets the criteria indicated by the list. The RO may be alerted as part of the RTO process, for example, as shown in Equation 9, as to the conditions such as the list and policy constraints. The RO, upon receipt of the SCARD, may independently decide whether or not it wants to be a stakeholder on the platform or device in question. The conditions sent to the RO may comprise domain types and their purposes, but not the actual names of the lists of any other ROs, so as to protect identities of the other ROs. If the RO decides to follow through with the RTO it may be assured that no deviation from the policy will be allowed by this RO or any other RO currently active on the platform or any other RO that could become active in the future. As a result the RO may not need to be, and may not be, alerted to subsequent RTOs that might take place.

Referring to the second method for domain management, only relatively broad restrictions, such as what remote owners are allowed without identifying any specific RO types, and policies that allow more interactions, such as requests for more information from the RO to the SDM or some negotiations, may be performed during the RTO process. There may also be ongoing collaboration between the SDM and all ROs as the domain configurations change. Thus, initial, and even follow up, negotiations may occur as part of the RO/SDM dynamics.

As part of the RTO process the RO may be given attestation and policy condition information it requires such as TPIA, TPES, and SCARD which may include more general information, compared to the case of the first method, regarding the configuration and its trustworthiness. Based on the existing domain configuration, the target RO may decide whether or not to continue with the RTO. Unless the target RO immediately decides against taking ownership, a negotiation process with the SDM may ensue. For example, the SDM may demand from the target RO what domain types and attendant services can be active while the target RO's domain is active, or what procedures to pursue in the event that a domain type for which it objects to is about to become active. The RO may require, for example, that its own domain be rendered inactive when certain other domain types or even domains owned by certain other ROs become active or are about to become active, or it might require that it remain active but in a diminished capacity or capability. The SDM may also request from the RO what event occurrences for which it should be alerted. Such events might include domain types, for which it objects, becoming active or inactive. The RO may require that other domain types or domains held by certain other owners be entirely blocked from any activity while it's own domain is active.

The SDM may decide to accept or reject such conditions. Although operating with a broad set of policy requirements the SDM may have the latitude and semantic capability to decide whether accepting the demands from the RO may still comply to the letter or intent of a "static" System Domain Policy (SDP).

Figure 7:
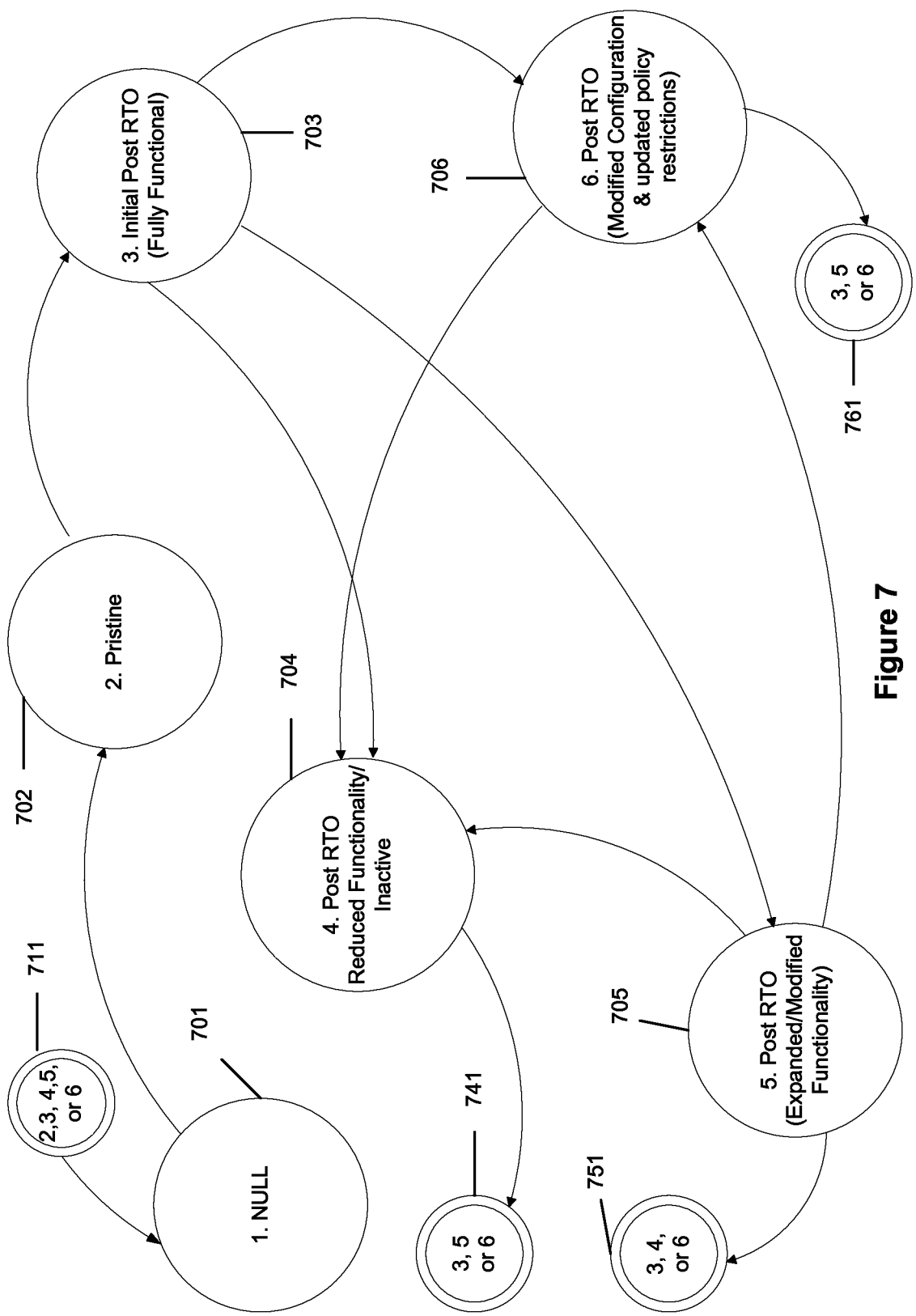
FIG. 7 illustrates exemplary states that remote owner domains may achieve and the conditions under which the transitions can occur in a dynamically managed environment.

FIG. 7 illustrates exemplary states that RO domains may achieve and the conditions under which the transitions can occur in a dynamically managed environment. At 701, a null state may exist, e.g., an RO may not be built. From 701, a pristine RO domain may be built according to a SDP, leaving the RO domain at state 702. From 702, a RTO process may be performed, including the RO acquiring a TPIA, TPES and SCARD. Further, the RO may accept the conditions of the RTO, leaving the RO domain at state 703. From 703, it may be determined that there is a policy conflict with a newly active domain, and in response, reducing the functionality of the RO domain or rendering it inactive, leaving the RO domain at state 704. Also from 703, the RO domain may receive an updated policy/configuration change, resulting in the RO domain having a modified configuration and/or updated policy restrictions. From 706, it may be determined that there is a policy conflict with a newly active domain, and in response, reducing the functionality of the RO domain or rendering it inactive, leaving the RO domain at state 704. Also from 703, a new software component may be introduced via a download or RTO, resulting in a modified/expanded state of the RO domain, leaving the RO domain at 705. From 705, it may be determined that there is a policy conflict with a newly active domain, and in response, reducing the functionality of the RO domain or rendering it inactive, leaving the RO domain at state 704.

As illustrated at 711, a RO domain at state 702, 703, 704, 705 or 706 may become null, for example, deletion by the DO, RO, etc. As illustrated at 741, an inactive/reduced functionality RO domain may move to state 703, 705 or 706, for example, by resolving the conflict that caused the RO domain to move to state 704. As illustrated at 751, an RO domain at state 705 may move to state 703, 704 or 706. As illustrated at 761, an RO domain at state 706 may move to state 703, 705 or 706.

With Respect to Management of RO Domain what may be allowed as part of dynamic domain management is for negotiating requirements to change as events unfold. For example, the RO might decide that a certain service offered by another RO, previously objectionable, is now permissible as a result of deciding that it no longer needs to compete with that service. Changes to business models over time may affect negotiating strategies and policies by prospective ROs. A SDP employing a dynamic policy structure can be made to accommodate such strategy alterations.

In services such as, but not limited to, M2M geo-tracking combined with smart-billing, preferred roaming partnerships or closed group of RO's may form. Such grouped services, where different operators providing similar or different services partner among each other, may lead to preferred closed groups. Such a preferred group of services, operators, or both may be offered as a bundled service or a package deal to a device user.

In a first example, a package may be tracked as it travels around the globe. Millions of such geo-tracking devices may be utilized. As the package traverses the continents, it is provided connectivity by different operators in different countries. Thus, to get connectivity, the user may need to subscribe to multiple roaming profiles. These roaming profiles, that span various remote operators will be managed as inter domain policies since each domain is owned and managed by a remote operator. The policies can also be enforced to support complete handover to the new service provider instead of supporting roaming based solutions.

In a second example, a partnership between smart metering operators and geo-tracking operators is described. These domains may be owned and operated by different operators. Due to business partnerships or user preferences, domains may be combined to support a joint profile. For billing based on the usage of resources, such as labor, storage, or parking, smart billing may be used alongside the tracking of the packages. Such cases of co-existing services falling into separate categories may use the support of an inter domain policy management.

An Inter Domain Policy Manager (IDPM) may manage the policies governing the group behavior of Domains. Inter Domain Policies (IDP) may be downloaded by each RO during the RTO process. The IDPs may be authenticated by a certificate which is signed by each RO. These certificates may be issued along with the IDP. Alternatively, these policies may be certified and downloaded by external service dealers. Device Users or Device Owners interested in creating a preferred operator list may create IDPs. The IDPM may process these policies by evaluating an acceptable intersection of the candidate policies or priority selecting IDPs and then enforcing the resultant policy.

An IDPM can be alternatively added to the SDM as one of its functionality, or as a separate entity which can be loaded (built) or downloaded onto a THSM.

As part of the attestation protocol, the $TD_{RO}$ may send to the RO a hash of the TPIA, TPES, and SCARD, instead of sending these measurements in full. The RO may have a means, either by itself or by way of a TTP, to verify such hashes and thereby make assessments of the viability of the TDRO and the surrounding systems. This method may be similar to a Semi Autonomous Validation (SAV) as has been specified in PCT patent application WO 2009/092115 (PCT/US2009/031603). Any one or two of the TPIA, TPES, and SCARD measurements may be sent out during the attestation phase.

The THSM may be embedded integrally as part of the ME. The RTO process for such a device may be simplified, since the process will rid of the interface between the ME and the THSM.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed:

1. A system comprising:
   a device comprising a plurality of domains supported by at least one platform, each domain comprising a configuration of computing resources executing on the at least one platform and each domain being configured to perform functions for an owner of the domain that may be located locally or remotely from the domain, wherein each domain may have a different owner, and wherein each owner may specify policies for operation of its domain, and the domains are isolated from each other such that their respective computing resources cannot be accessed by the other domains without authorization by the respective domain owner; and
   a system-wide domain manager resident on one of the domains, the system-wide domain manager configured to:
      enforce the policies of the domain on which it is resident,
      coordinate the enforcement of respective policies of the other domains in relation to the domain in which the system-wide domain manager resides,
      coordinate the interaction among the other domains in accordance with their respective policies and the policies of the domain in which the system-wide domain manager resides,
      make a request that the other domains produce a respective integrity attestation, wherein the request comprises authorization data, such that the other domains can verify, using the authorization data, that the system-wide domain manager has authority to make the request for the integrity attestation;
      evaluate whether the computing resources are sufficient to load a new domain that is isolated from the other domains on the device,
      and if the computing resources are sufficient, determine to load the new domain based on one or more policies of at least one of the domains, wherein the computing resources comprise memory and virtual machine threads.

2. The system of claim 1, wherein the system-wide domain manager provides information to a domain owner to enable the owner to determine whether its policies are being complied with.

3. The system of claim 1, wherein an owner of one of said domains comprises a manufacturer of the device in which that domain resides.

4. The system of claim 1, wherein an owner of one of said domains comprises a service provider.

5. The system of claim 4, wherein the domain owned by the service provider performs a subscriber identity module (SIM) function to authenticate to the service provider the subscription to the service as supported by the device on which the domain resides whereby such authentication of subscription with the service provider enables communications between the device and the service provider.

6. The system of claim 1, wherein at least one of the domains performs subscription authentication.

7. The system of claim 1, wherein at least one of the domains performs device authentication.

8. The system of claim 1, wherein said one or more devices comprises one or more of a wireless transmit/receive unit, a user equipment, a mobile station, a fixed or mobile subscriber unit, a pager, a cellular telephone, a personal digital assistant, a computing device, a machine-to-machine device, a SIM card, a Universal Integrated Circuit Card (UICC), a geo-tracking device, or a billing device.

9. The system of claim 1, wherein said at least one platform comprises at least one processor.

10. The system of claim 9, wherein said at least one platform further comprises at least one memory.

11. The system of claim 9, wherein said at least one platform further comprises at least one operating system and at least one piece of low-level firmware or software.

12. The system of claim 1, wherein the system-wide domain manager accesses information providing a list of resources available for use by said one or more domains.

13. The system of claim 1, wherein the system-wide domain manager supervises the loading and maintenance of domains owned by remote owners.

14. The system of claim 13, wherein the system-wide domain manager considers the policies of one or more existing domains when evaluating whether to load a new domain.

15. The system of claim 14, wherein a policy of a given domain owned by a remote owner may specify that the given domain be rendered inactive when a certain type of other domain becomes active.

16. The system of claim 14, wherein a policy of a given domain owned by a remote owner may specify that the given domain be rendered inactive when another domain owned by a certain other remote owner becomes active.

17. The system of claim 14, wherein a policy of a given domain owned by a remote owner may specify that operation of the given domain be limited when a certain type of other domain becomes active.

18. The system of claim 14, wherein a policy of a given domain owned by a remote owner may specify that operation of the given domain be limited when another domain owned by a certain other remote owner becomes active.

19. The system of claim 1, wherein at least one domain may be established in a state in which it is not owned by any owner, and wherein the system-wide domain manager coordinates the establishment of ownership of the domain by a remote owner.

20. The system of claim 19, wherein the remote owner and the domain in the system may authenticate each other.

21. The system of claim 19, wherein the remote owner and the domain in the system may communicate with each other via a secure channel set up between them.

22. The system of claim 19, wherein the system-wide domain manager transmits information to a remote owner that the remote owner may consider in determining whether to establish ownership of the domain.

23. The system of claim 22, wherein the information comprises at least one of (i) information attesting to an integrity of the domain for which ownership is sought; and (ii) information attesting to an integrity of at least one other domain of the system.

24. The system of claim 22, wherein the information comprises at least one of (i) information attesting to an integrity of the platform using whose resources the domain for which the ownership is sought for operates; and (ii) information attesting to an integrity of the platform using whose resources at least one other domain of the system operates.

25. The system of claim 22, wherein the information comprises information concerning a current environment of the device.

26. The system of claim 25, wherein the information comprises at least one of: (i) a value indicating a number of other domains in the system; (ii) information providing a summary nature of other domains in the system; and (iii) information specifying resources of the platform available for use by the domain for which ownership is attempting to be established.

27. The system of claim 22, wherein the degree to which information is provided to the remote owner about other domains of the system is conditioned on the respective policies of those other domains.

28. The system of claim 19, wherein after a remote owner establishes ownership of the domain, the domain receives from the remote owner at least one of cryptographic keys, configuration information, parameters and executable code to increase the functionality of the domain.

29. The system of claim 19, wherein after a remote owner establishes ownership of the domain, the domain receives its policy from the remote owner.

30. The system of claim 1, wherein at least one of said domains comprises a secure execution and storage environment that is isolated from other domains.

31. The system of claim 30, wherein the platform of the device on which said at least one of said domains resides controls access to the resources of that domain so that only users, owners or other entities or processes external to that domain that are authorized may access those resources.

32. The system of claim 30, wherein the at least one platform that supports said at least one domain comprises a root of trust, and wherein an integrity of the domain is established by a chain of trust anchored by said root of trust.

33. The system of claim 32, wherein an integrity of a domain is established by comparing a measurement of at least one component of said domain to a reference integrity metric, wherein the integrity of the domain is verified if the measurement matches the reference integrity metric.

34. The system of claim 33, wherein said at least one component of the domain comprises executable code and/or data of the domain.

35. The system of claim 33, wherein the measurement comprises a hash computed over the component, and wherein the reference integrity metric comprises a hash previously computed over the component and accompanied by a digital certificate that provides an indication of authenticity of the reference integrity metric.

36. The system of claim 1, further comprising an inter domain policy manager that manages policies governing behavior of a group of domains.

37. The system of claim 36, wherein the inter domain policy manager evaluates an intersection of individual policies of each domain of the group and selects among those policies to produce a resultant policy governing behavior of the group that it then enforces.

38. In a system comprising a device that comprises a plurality of domains supported by at least one platform, wherein each domain comprises a configuration of computing resources executing on the at least one platform and each domain is configured to perform functions for an owner of the domain that may be located locally or remotely from the domain, wherein each domain may have a different owner, and wherein each owner may specify policies for operation its domain, and the domains are isolated from each other such that their respective computing resources cannot be accessed by the other domains without authorization by the respective domain owner, a method comprising:
  at least two of the domains authenticating each other and communicating with each other via a secure channel set up between them; and
  managing, by a system-wide domain manager residing in one of the domains, the operation of said domains, said managing comprising:
    enforcing the policies of the domain on which the system-wide domain manager is resident;
    coordinating the enforcement of respective policies of the other domains in relation to the domain in which the system-wide domain manager resides;
    coordinating the interaction among the other domains in accordance with their respective policies and the policies of the domain in which the system-wide domain manager resides;
    making a request that the other domains produce a respective integrity attestation, wherein the request comprises authorization data, such that the other domains can verify, using the authorization data, that the system-wide domain manager has authority to make the request for the integrity attestation;
    evaluating whether the computing resources are sufficient to load a new domain that is isolated from the other domains on the device;

and if the computing resources are sufficient, determining to load the new domain based on one or more policies of at least one of the domains, wherein the computing resources comprise memory and virtual machine threads.

39. The method of claim 38, further comprising providing information to a domain owner to enable the owner to determine whether its policies are being complied with.

40. The method of claim 38, wherein an owner of one of said domains comprises a manufacturer of the device in which that domain resides.

41. The method of claim 38, wherein an owner of one of said domains comprises a service provider.

42. The method of claim 41, further comprising performing, by the domain owned by the service provider, a subscriber identity module (SIM) function to authenticate to the service provider the subscription to the service as supported by the device on which the domain resides whereby such authentication of subscription with the service provider enables communications between the device and the service provider.

43. The method of claim 38, further comprising performing, by at least one of the domains, subscription authentication.

44. The method of claim 38, further comprising performing, by at least one of the domains, device authentication.

45. The method of claim 38, wherein said one or more devices comprises one or more of a wireless transmit/receive unit, a user equipment, a mobile station, a fixed or mobile subscriber unit, a pager, a cellular telephone, a personal digital assistant, a computing device, a machine-to-machine device, a SIM card, a Universal Integrated Circuit Card (UICC), a geo-tracking device, or a metering device.

46. The method of claim 38, wherein said at least one platform comprises at least one processor.

47. The method of claim 46, wherein said at least one platform further comprises at least one memory.

48. The method of claim 46, wherein said at least one platform further comprises at least one operating system and at least one piece of low-level firmware or software.

49. The method of claim 38, further comprising accessing information providing a list of resources available for use by said one or more domains.

50. The method of claim 38, further comprising supervising the loading and maintenance of domains owned by remote owners.

51. The method of claim 50, further comprising considering the policies of one or more existing domains when evaluating whether to load a new domain.

52. The method of claim 51, further comprising rendering a given domain inactive when a certain type of other domain becomes active, in accordance with a policy of that given domain.

53. The method of claim 51, further comprising rendering a given domain owned by one remote owner inactive when another domain owned by a certain other remote owner becomes active, in accordance with a policy of that given domain.

54. The method of claim 51, further comprising limiting the operation of a given domain when a certain type of other domain becomes active, in accordance with a policy of that given domain.

55. The method of claim 51, further comprising limiting the operation of a given domain owned by one remote owner when another domain owned by a certain other remote owner becomes active, in accordance with a policy of that given domain.

56. The method of claim 38, further comprising establishing at least one domain in a state in which it is not owned by any owner, and then coordinating the establishment of ownership of the domain by a remote owner.

57. The method of claim 56, further comprising transmitting information to a remote owner that the remote owner may consider in determining whether to establish ownership of the domain.

58. The method of claim 57, wherein the information comprises at least one of (i) information attesting to an integrity of the domain for which ownership is sought; and (ii) information attesting to an integrity of at least one other domain of the system.

59. The method of claim 57, wherein the information comprises at least one of (i) information attesting to an integrity of the platform using whose resources the domain for which the ownership is sought for operates; and (ii) information attesting to an integrity of the platform using whose resources at least one other domain of the system operates.

60. The method of claim 57, wherein the information comprises information concerning a current environment of the device.

61. The method of claim 60, wherein the information comprises at least one of: (i) a value indicating a number of other domains in the system; (ii) information providing a summary nature of other domains in the system; and (iii) information specifying resources of the platform available for use by the domain for which ownership is attempting to be established.

62. The method of claim 57, further comprising conditioning a degree to which information is provided to the remote owner about other domains of the system based on the respective policies of those other domains.

63. The method of claim 57, further comprising authenticating the remote owner by the domain for which the remote owner is establishing ownership.

64. The method of claim 57, further comprising communicating between the remote owner and the domain for which the remote owner is establishing ownership via a secure channel set up between them.

65. The method of claim 56, further comprising, after a remote owner establishes ownership of the domain, receiving from the remote owner at least one of cryptographic keys, configuration information, parameters and executable code to increase the functionality of the domain.

66. The method of claim 56, further comprising, after a remote owner establishes ownership of the domain, receiving a policy for the domain from the remote owner.

67. The method of claim 38, wherein at least one of said domains comprises a secure execution and storage environment that is isolated from other domains.

68. The method of claim 67, further comprising controlling access, by the platform of the device on which said at least one of said domains resides, to the resources of that domain so that only users, owners or other entities or processes external to that domain that are authorized may access those resources.

69. The method of claim 67, wherein the at least one platform that supports said at least one domain comprises a root of trust, and wherein the method further comprises establishing an integrity of the domain by a chain of trust anchored by said root of trust.

70. The method of claim 69, wherein establishing an integrity of a domain comprises comparing a measurement of at least one component of said domain to a reference integrity metric, wherein the integrity of the domain is verified if the measurement matches the reference integrity metric.

71. The method of claim 70, wherein said at least one component of the domain comprises executable code and/or data of the domain.

72. The method of claim 70, wherein the measurement is obtained by computing a hash over the component, and wherein the reference integrity metric comprises a hash previously computed over the component and accompanied by a digital certificate that provides an indication of authenticity of the reference integrity metric.

73. The method of claim 38, further comprising managing policies governing behavior of a group of domains.

74. The method of claim 73, further comprising:
  evaluating an intersection of individual policies of each domain of the group and selecting among those policies to produce a resultant policy governing behavior of the group; and
  enforcing the resultant policy of the group.

75. The method of claim 38, further comprising authenticating, by one domain, at least one other domain.

\* \* \* \* \*